United States Patent
Bubb

(10) Patent No.: US 12,528,747 B2
(45) Date of Patent: Jan. 20, 2026

(54) CEMENT MIXTURES FOR PLUGGING HONEYCOMB BODIES AND METHODS OF MAKING THE SAME

(71) Applicant: CORNING INCORPORATED, Corning, NY (US)

(72) Inventor: Keith Norman Bubb, Beaver Dams, NY (US)

(73) Assignee: CORNING INCORPORATED, Corning, NY (US)

( * ) Notice: Subject to any disclaimer, the term of this patent is extended or adjusted under 35 U.S.C. 154(b) by 569 days.

(21) Appl. No.: 17/925,649

(22) PCT Filed: Aug. 10, 2021

(86) PCT No.: PCT/US2021/045299
§ 371 (c)(1),
(2) Date: Nov. 16, 2022

(87) PCT Pub. No.: WO2022/046399
PCT Pub. Date: Mar. 3, 2022

(65) Prior Publication Data
US 2023/0278933 A1 Sep. 7, 2023

Related U.S. Application Data

(60) Provisional application No. 63/069,965, filed on Aug. 25, 2020.

(51) Int. Cl.
*C04B 38/00* (2006.01)
*B01D 39/20* (2006.01)
(Continued)

(52) U.S. Cl.
CPC ...... *C04B 38/0012* (2013.01); *B01D 39/2075* (2013.01); *B01D 46/0001* (2013.01);
(Continued)

(58) Field of Classification Search
CPC .......... C23C 16/4412; H01L 21/67017; B01D 53/0438; B01D 53/0446; B01D 53/0454;
(Continued)

(56) References Cited

U.S. PATENT DOCUMENTS 3,885,977 A  5/1975  Lachman et al.
4,483,944 A  11/1984  Day et al.
(Continued)

FOREIGN PATENT DOCUMENTS

CN  101801879 A  8/2010
CN  105906367 A  8/2016
(Continued)

OTHER PUBLICATIONS

International Search Report and Written Opinion of the International Searching Authority; PCT/US2021/045299; dated Nov. 26, 2021; 14 pages; European Patent Office.

*Primary Examiner* — Robert Clemente
(74) *Attorney, Agent, or Firm* — Kevin M Able

(57) ABSTRACT

A cement mixture for applying to a ceramic honeycomb body that includes: (i) inorganic ceramic particles; (ii) an inorganic binder; (iii) an organic binder containing a hydrophilic polymer and a hydrophilic additive comprising a polymer with a different composition than the composition of the hydrophilic polymer, the additive having a weight average molecular weight ($M_w$) of at least 1,000,000 g/mol; and (iv) an aqueous liquid vehicle.

20 Claims, 19 Drawing Sheets

(51) Int. Cl.
*B01D 46/00* (2022.01)
*B01D 46/24* (2006.01)
*C04B 14/30* (2006.01)
*C04B 24/28* (2006.01)
*C04B 28/24* (2006.01)
*C04B 103/00* (2006.01)
*C04B 111/00* (2006.01)

(52) U.S. Cl.
CPC ..... *B01D 46/2459* (2013.01); *B01D 46/2482* (2021.08); *C04B 14/303* (2013.01); *C04B 24/281* (2013.01); *C04B 28/24* (2013.01); *B01D 2279/30* (2013.01); *C04B 2103/0051* (2013.01); *C04B 2111/00663* (2013.01)

(58) Field of Classification Search
CPC ........ B01D 2257/204; B01D 2257/406; B01D 2257/553; B01D 2257/60; B01D 2258/0216; B01D 46/2418–2498; B01D 2279/30; B01D 39/2075; B01D 46/0001; C04B 38/0012; C04B 14/303; C04B 24/281; C04B 28/24; C04B 2103/0051; C04B 2111/00663
See application file for complete search history.

(56) References Cited

U.S. PATENT DOCUMENTS

| | | | |
|---|---|---|---|
| 4,855,265 A | 8/1989 | Day et al. |
| 5,183,608 A | 2/1993 | Guile |
| 5,258,150 A | 11/1993 | Merkel et al. |
| 5,290,739 A | 3/1994 | Hickman |
| 5,925,308 A | 7/1999 | Fewkes et al. |
| 6,210,626 B1 | 4/2001 | Cornelius et al. |
| 6,319,870 B1 | 11/2001 | Beall et al. |
| 6,368,992 B1 | 4/2002 | Beall et al. |
| 6,432,856 B1 | 8/2002 | Beall et al. |
| 6,620,751 B1 | 9/2003 | Ogunwumi |
| 6,673,300 B2 | 1/2004 | Allen et al. |
| 6,773,657 B2 | 8/2004 | Beall et al. |
| 6,843,955 B2 | 1/2005 | Ghosh et al. |
| 6,849,181 B2 | 2/2005 | Ogunwumi et al. |
| 6,864,198 B2 | 3/2005 | Merkel |
| 6,942,713 B2 | 9/2005 | Ogunwumi et al. |
| RE38,888 E | 11/2005 | Beall et al. |
| 8,435,441 B2 | 5/2013 | Bookbinder et al. |
| 8,623,128 B2 | 1/2014 | Bayer et al. |
| 8,641,815 B2 | 2/2014 | Crume |
| 10,450,914 B2 | 10/2019 | Suzuki et al. |
| 2002/0098967 A1 | 7/2002 | Morena et al. |
| 2004/0020846 A1 | 2/2004 | Ogunwumi et al. |
| 2004/0029707 A1 | 2/2004 | Beall et al. |
| 2004/0092381 A1 | 5/2004 | Beall et al. |
| 2004/0261384 A1 | 12/2004 | Merkel et al. |
| 2006/0166820 A1 | 7/2006 | Ogyu et al. |
| 2009/0033005 A1 | 2/2009 | Bookbinder et al. |
| 2009/0243150 A1 | 10/2009 | Koketsu |
| 2009/0286041 A1 | 11/2009 | Deneka et al. |
| 2011/0294650 A1 | 12/2011 | Fredholm et al. |
| 2013/0207323 A1 | 8/2013 | Uoe |
| 2017/0044066 A1 | 2/2017 | Bubb et al. |
| 2017/0234181 A1 | 8/2017 | Shibayama et al. |
| 2018/0326613 A1 | 11/2018 | Enatsu et al. |
| 2022/0274890 A1 | 9/2022 | Bergman et al. |

FOREIGN PATENT DOCUMENTS

| | | |
|---|---|---|
| DE | 102007000475 A1 | 5/2008 |
| EP | 2390307 A1 | 11/2011 |
| IN | 108383449 A | 8/2018 |
| WO | 2002/038513 A1 | 5/2002 |
| WO | 2004/011386 A1 | 2/2004 |
| WO | 2005/046840 A1 | 5/2005 |
| WO | 2006/015240 A2 | 2/2006 |
| WO | 2018/019957 A1 | 2/2018 |
| WO | 2021/030106 A1 | 2/2021 |

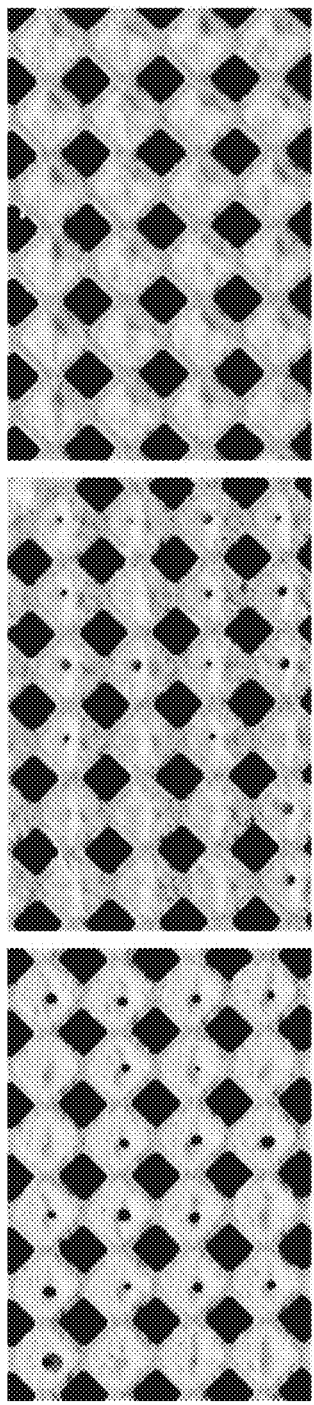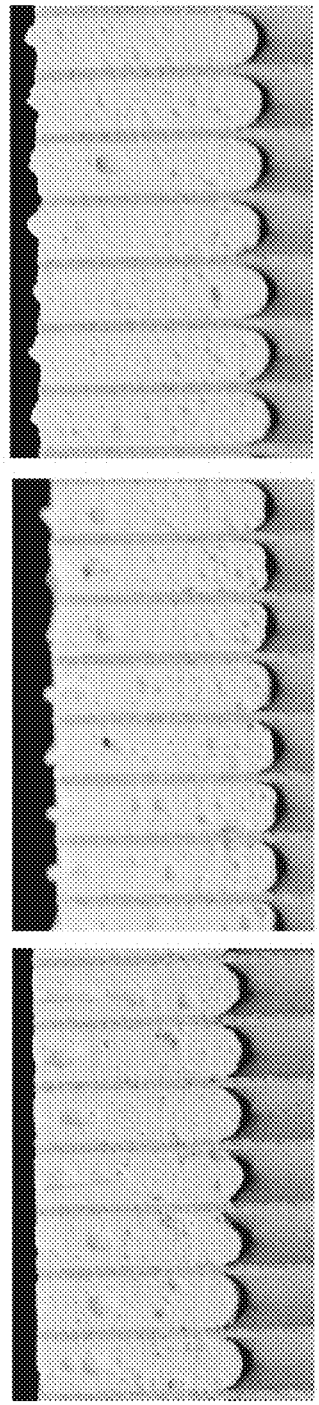
FIG. 16A  FIG. 16B  FIG. 16C

CEMENT MIXTURES FOR PLUGGING HONEYCOMB BODIES AND METHODS OF MAKING THE SAME

CROSS REFERENCE TO RELATED APPLICATION

This is a national stage application under 35 U.S.C. § 371 of International Application No. PCT/US2021/045299 filed on Aug. 10, 2021, which claims the benefit of priority under 35 U.S.C. § 119 of U.S. Provisional Application Ser. No. 63/069,965 filed on Aug. 25, 2020, the content of which is relied upon and incorporated herein by reference in its entirety.

FIELD OF THE DISCLOSURE

The disclosure relates generally to the manufacture of porous ceramic particulate filters, and more particularly to plugging mixtures and processes for sealing selected channels of porous ceramic honeycombs to form wall-flow ceramic filters.

BACKGROUND

Ceramic wall flow filters, or particulate filters, may be used for the removal of particulate pollutants from fluid streams, such as diesel or other combustion engine exhaust streams. A number of different approaches for manufacturing such filters from channeled honeycomb structures formed of porous ceramics are known. One approach to manufacture such filters is to position plugs of sealing material at the ends of alternate channels of such structures, which directs the fluid stream through the porous channel walls of the honeycombs before exiting the filter, while trapping particulate matter (e.g., matter too large to pass through the porous walls) in the plugged channels.

There is a continued need in the art for plugging mixtures useful in the manufacture of ceramic wall flow filters suitable to a variety of filter geometries, operating conditions, and/or applications.

SUMMARY OF THE DISCLOSURE

According to some aspects of the present disclosure, a cement mixture for applying to a ceramic honeycomb body is provided. The cement mixture includes: (i) inorganic ceramic particles; (ii) an inorganic binder; (iii) an organic binder containing a hydrophilic polymer and a hydrophilic additive including a polymer with a different composition than the composition of the hydrophilic polymer, the additive having a weight average molecular weight ($M_w$) of at least 1,000,000 g/mol; and (iv) an aqueous liquid vehicle.

According to some aspects of the present disclosure, a method for manufacturing a porous ceramic wall flow filter is provided. The method of manufacturing includes a step of selectively inserting a cement mixture into an end of at least one predetermined cell channel of a ceramic honeycomb structure, wherein the ceramic honeycomb structure includes a matrix of intersecting porous ceramic walls which form a plurality of cell channels bounded by the porous ceramic walls that extend longitudinally from an upstream inlet end to a downstream outlet end. The cement mixture includes: (i) inorganic ceramic particles; (ii) an inorganic binder; iii) an organic binder containing a hydrophilic polymer and a hydrophilic additive including a polymer with a different composition than the composition of the hydrophilic polymer, the additive having a weight average molecular weight ($M_w$) of at least 1,000,000 g/mol; and (iv) an aqueous liquid vehicle. The cement mixture is disposed in the at least one predetermined cell channel in the form of at least one respective plug that blocks the respective at least one cell channel. The method of manufacturing also includes a step of drying the at least one respective plug for a period of time sufficient to at least partially remove the aqueous liquid vehicle from the mixture.

According to some aspects of the present disclosure, a filter body is provided that includes: a honeycomb structure having intersecting porous walls of a first ceramic material that define channels extending from a first end to a second end; plugging material disposed in a first plurality of the channels at the first end; plugging material disposed in a second plurality of the channels at the second end, wherein the channels of the first plurality are distinct from the channels of the second plurality and the first plurality of channels have a first cross-sectional area that is different than a second cross-sectional area of the second plurality of channels, and wherein the plugging material in both the first plurality of channels and the second plurality of channels is derived from a cement mixture comprising: (i) inorganic ceramic particles; (ii) an inorganic binder; and (iii) an organic binder containing a hydrophilic polymer and a hydrophilic additive including a polymer with a different composition than the composition of the hydrophilic polymer, the additive having a weight average molecular weight ($M_w$) of at least 1,000,000 g/mol.

According to some aspects of the present disclosure, a particulate filter comprises a honeycomb structure that comprises intersecting porous walls of a first ceramic material that define channels extending from a first end to a second end. Plugs are disposed in a first plurality of the channels at the first end and plugs are disposed in a second plurality of the channels at the second end, wherein the channels of the first plurality are distinct from the channels of the second plurality and the first plurality of channels have a first cross-sectional area that is different than a second cross-sectional area of the second plurality of channels. The plugs in both the first plurality of channels and the second plurality of channels have a depth of at least 9 mm and the plugs in both the first plurality of channels and the second plurality of channels comprise the same cement mixture.

According to some aspects of the present disclosure, a cement mixture for applying to a honeycomb body is provided. The cement mixture comprises: (i) inorganic ceramic particles; (ii) an inorganic binder; (iii) an organic binder comprising one or more of a hydrophilic polymer and a hydrophilic additive; and (iv) an aqueous liquid vehicle. The cement mixture exhibits a cement viscosity of less than 7000 Pa·s at a shear rate of less than 0.1/sec and greater than 25 Pa·s at a shear rate from 20/sec to 100/sec.

According to some aspects of the present disclosure, a cement mixture for applying to a honeycomb body is provided. The cement mixture comprises: (i) inorganic ceramic particles from 55% to 70% by weight; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to some aspects of the present disclosure, a method for manufacturing a porous ceramic wall flow filter is provided. The method for manufacturing comprises a step of selectively inserting a cement mixture into an end of at least one predetermined cell channel of a ceramic honeycomb structure, wherein the ceramic honeycomb structure comprises a matrix of intersecting porous ceramic walls which form a plurality of cell channels bounded by the porous ceramic walls that extend longitudinally from an upstream inlet end to a downstream outlet end and the cement mixture comprises: (i) inorganic ceramic particles; (ii) an inorganic binder; (iii) an organic binder comprising one or more of a hydrophilic polymer and a hydrophilic additive; and (iv) an aqueous liquid vehicle. The cement mixture disposed in at least one predetermined cell channel is in the form of at least one respective plug that blocks the respective at least one channel. The method also comprises a step of drying the at least one plug for a period of time sufficient to at least substantially remove the liquid vehicle from the at least one plug. The cement mixture exhibits a cement viscosity of less than 7000 Pa·s at a shear rate of less than 0.1/sec and greater than 25 Pa·s at a shear rate from 20/sec to 100/sec.

According to some aspects of the disclosure, a filter body is provided that comprises: a honeycomb structure comprised of intersecting porous walls of a first ceramic material that define channels extending from a first end to a second end; plugging material disposed in a first plurality of the channels; plugging material disposed in a second plurality of the channels, wherein the channels of the first plurality are distinct from the channels of the second plurality; wherein the plugging material disposed in the first plurality, or in the second plurality, or both, is comprised of: a second ceramic material; an inorganic binder comprising one or more of silica and alumina; and an organic binder comprising one or more of a hydrophilic polymer and a hydrophilic additive.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 16A is a pair of optical micrographs of an end view (top) and a cross-sectional view (bottom) of a porous ceramic wall flow filter plugged with a comparative cement mixture;

FIG. 16B is a pair of optical micrographs of an end view (top) and a cross-sectional view (bottom) of a porous ceramic wall flow filter plugged with an exemplary cement mixture, according to embodiments of the present disclosure; and FIG. 16C is a pair of optical micrographs of an end view (top) and a cross-sectional view (bottom) of a porous ceramic wall flow filter plugged with an exemplary cement mixture, according to embodiments of the present disclosure.

Figure 1A:
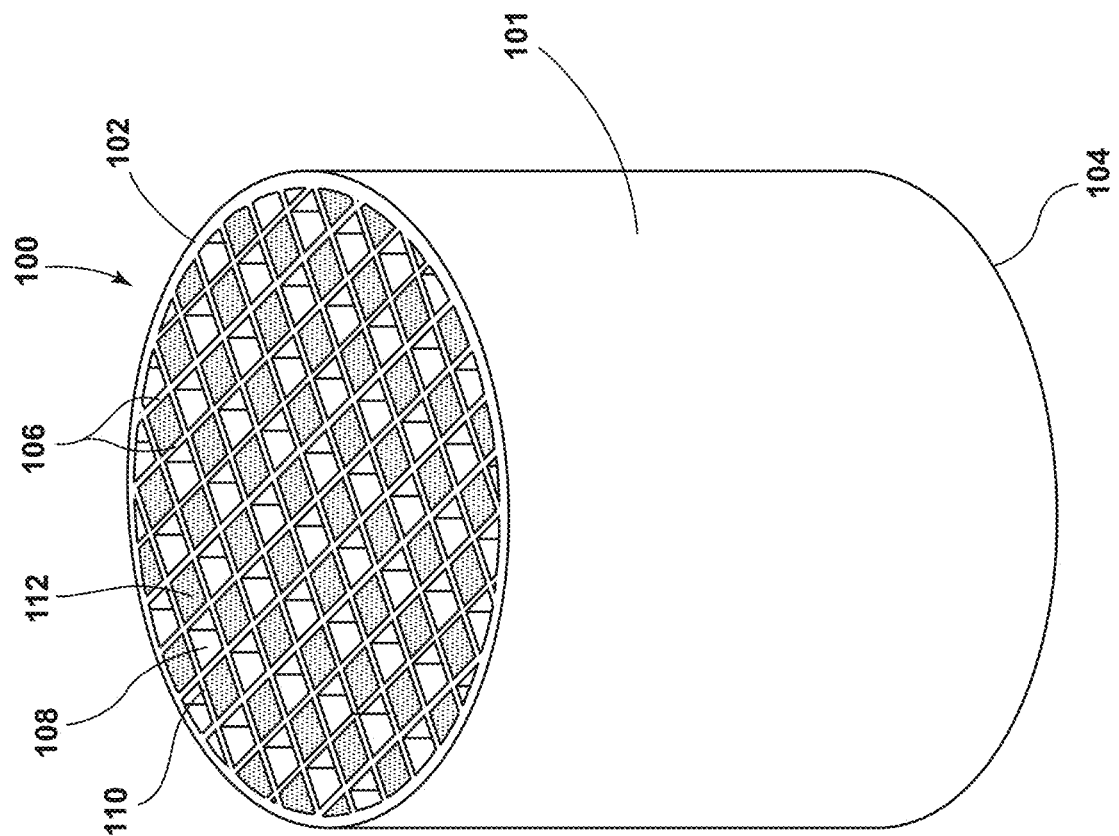
FIG. 1A is a perspective view of an end plugged wall flow filter, according to an embodiment of the disclosure.

The foregoing summary, as well as the following detailed description of certain inventive techniques, will be better understood when read in conjunction with the figures. It should be understood that the claims are not limited to the arrangements and instrumentalities shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to.

Unless otherwise noted, the terms "substantial," "substantially," and variations thereof as used herein are intended to note that a described feature is equal or approximately equal to a value or description. Moreover, "substantially" is intended to denote that two values are approximately equal or even equal.

Directional terms as used herein—for example up, down, right, left, front, back, top, bottom—are made only with reference to the figures as drawn and are not intended to imply absolute orientation.

As used herein, a "wt. %", "weight percent" or "percent by weight" of a component, unless specifically stated to the contrary, is based on the total weight of the cement mixture in which the component is included, unless otherwise specified.

As used herein, the term "optional" or "optionally" means that the subsequently described event or circumstance may or may not occur, and that the description includes instances where said event or circumstance occurs and instances where it does not.

As used herein, the term "liquid viscosity" refers to a liquid viscosity measurement of the liquids component of the cement mixtures of the disclosure, i.e., as excluding its inorganic ceramic particles constituent. Further, the "liquid viscosity" values and ranges reported in the disclosure are as measured with a Kinexus Pro rheometer (manufactured by Malvern Panalytical Ltd.) with a spindle geometry C25 and reported in units of centipoise (cP) vs. shear rate ($s^{-1}$). Unless otherwise noted, liquid viscosity measurements of the liquids component are obtained with the cement mixtures at a shear rate range from about 0.001/s to about 100/s, or a sub-range within this range.

As used herein, the term "cement viscosity" or "viscosity" refers to a viscosity measurement of the solids component of the cement mixtures of the disclosure, i.e., as without excluding any of its constituents. Further, the "cement viscosity" values and ranges reported in the disclosure are as measured with a Brookfield viscometer with a spiral adapter spindle and reported in units of Pa·s vs. shear rate ($s^{-1}$). Unless otherwise noted, cement viscosity measurements are obtained with the cement mixtures at a shear rate range from about 0.007/s to about 100/s.

In some embodiments, the cement mixtures are cold set cements. As used herein, a cold set cement refers to a cement that is dried at a temperature(s) that is effective in removing moisture content from the cement mixture, but which is not sufficiently high to cause a reaction of any ceramic precursors in the cement mixture and/or sintering of any ceramic materials in the cement mixture.

As summarized generally above, the cold set cement mixtures disclosed herein offer an improved plugging mixture composition for forming plugs in ceramic wall flow filters. The cement mixtures of the disclosure employ: (i) inorganic ceramic particles; (ii) an inorganic binder; (iii) an organic binder comprising one or more of a hydrophilic polymer and a hydrophilic additive; and (iv) an aqueous liquid vehicle. In some embodiments of the present disclosure, the organic binder consists of a hydrophilic polymer and a hydrophilic additive comprising a polymer with a different composition than the composition of the hydrophilic polymer, the additive having a weight average molecular weight ($M_w$) of at least 1,000,000 g/mol. These cement mixtures provide a controlled rheology which can enable a broader range of plug depths without sacrificing plug strength, plug quality (e.g., as manifested by the avoidance of voids and dimples), uniformity of depth, as well as throughput and production speed.

Cement mixtures according to some embodiments disclosed herein comprise cement rheology modifiers (e.g., hydrophilic polymer(s) and/or hydrophilic additives) that can result in higher viscosity levels at high shear rates (which affects plug depth capability), and can maintain a lower viscosity at low shear rates (which affects plug quality). As is understood in the field of the disclosure, the shear rates of the cement mixture change during the process of plugging the honeycomb body—i.e., from low shear rates as the plugging mixture is contained in a reservoir and applied to the honeycomb body to high shear rates as the plugging mixture is injected into the channels of the honeycomb body and friction works against movement of the mixture within the channels. Ultimately, the cement mixtures of the disclosure possess a rheological behavior with viscosity levels that vary as a function of shear rate, which can help form a wall flow filter with a combination of high quality plugs and increased and/or consistent plug depths, particularly when the same plugging mixture is used in a filter having plugged channels of different cross-sectional areas.

Advantageously, the cement mixtures of the disclosure, when employed as plugging mixtures, do not result in the formation of appreciable amounts of pin holes, dimples or large internal voids. The cement mixtures have rheological properties sufficient to hold their shape while in the form of a preform slug yet that can also flow properly during pressing of the mixture into the channels of a honeycomb structure. Further, the cement mixtures of the disclosure can advantageously enable a wide range of plug depths (e.g., from 3 to 25 mm depending on the geometry of the honeycomb structure). The cement mixtures can also enable a broad plugging process window which can achieve a combination of plug depth and plug quality. Further, the cement mixtures of the disclosure can enable plugging of wall flow filters with varying, asymmetric channel sizes with a single cement mixture composition.

Referring now to FIG. 1A, an exemplary end plugged wall flow filter 100 is shown. As illustrated, the wall flow filter 100 (interchangeably, particulate filter) comprises a ceramic honeycomb structure 101 that has an upstream inlet end 102 and a downstream outlet end 104, and a multiplicity of cells 108 (inlet), 110 (outlet) extending longitudinally from the inlet end 102 to the outlet end 104. The multiplicity of cells is formed from intersecting porous cell walls 106. A first portion of the plurality of cell channels are plugged with end plugs 112 at the downstream outlet end (not shown) to form inlet cell channels 108 and a second portion of the plurality of cell channels are plugged at the upstream inlet end with end plugs 112 to form outlet cell channels 110. The exemplified plugging configuration forms alternating inlet and outlet channels (108 and 110, respectively) such that a fluid stream flowing into the filter through the open cells 108 at the inlet end 102, then through the porous cell walls 106, and out of the filter through the open cells 110 at the outlet end 104. The exemplified end plugged cell configuration can be referred to herein as a "wall flow" configuration since the flow paths resulting from alternate channel plugging direct a fluid stream being treated to flow through the porous ceramic cell walls prior to exiting the filter. Particulate matter in the fluid stream unable to pass through the porous walls 106 will be trapped in the inlet cell channels 108.

Figure 1B:
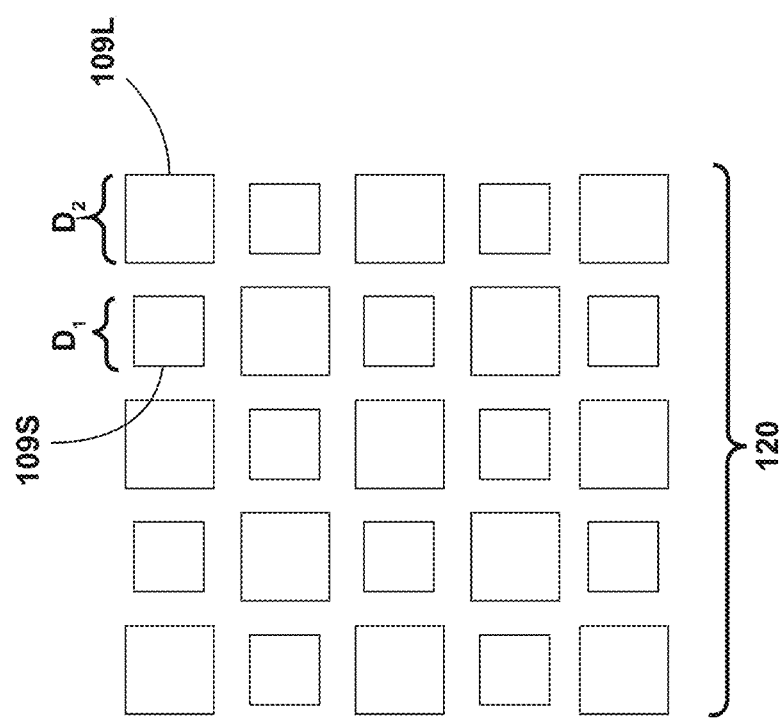
FIG. 1B is a schematic diagram of a cross-sectional view of a honeycomb body having an asymmetric cell channel pattern, according to an embodiment of the disclosure.

The cement mixtures described herein may also be advantageously utilized to plug honeycomb bodies having "asymmetric" channel designs, i.e., having adjacent channels of different cross-sectional dimensions (i.e., different hydraulic diameters). For example, an example of a portion of an asymmetric cell channel pattern 120 for the honeycomb structure 101 is shown in FIG. 1B, in which relatively "small" cell channels 109S having a cross-sectional dimension (e.g., width) D1, and relatively "large" cell channels 109L having a cross-sectional dimension (e.g., width) D2, where the cross-sectional dimension D2 of the larger cell channels 109L is greater than the cross-sectional dimension D1 of the small cell channels 109S. As described herein, the channels 109S, 109L can be plugged at opposite ends such that the inlet channels 108 are formed by plugging the large cell channels 109L at the outlet end 104, and the outlet channels 110 are formed by plugging the small cell channels 109S at the inlet end 102.

The honeycomb structure 101 can be formed from a material suitable for forming a porous monolithic honeycomb body. For example, in one embodiment, the honeycomb structure 101 is formed by shaping a plasticized ceramic forming composition (alternatively referred to as a batch mixture) in a green body of the desired honeycomb configuration, and then firing the shaped green body. Exemplary ceramic forming mixtures can include those for forming cordierite, aluminum titanate, silicon carbide, mullite, or other ceramic phases, such as comprising ceramic and/or ceramic precursor materials, such as aluminum oxide, zirconium oxide, titania, silica, magnesia, niobia, ceria, vanadia, silicon nitride, or any combination thereof.

The formed honeycomb structure 101 can have any suitable cell density, such as a cell density of from about 70 cells/in$^2$ (10.9 cells/cm$^2$, which my alternatively be referred to as "cells per square inch," or "cpsi") to about 400 cells/in$^2$ (62 cells/cm$^2$). Still further, as described above, a portion of the cells 110 at the inlet end 102 are plugged with end plugs 112 of a cement mixture having the same or similar composition to that of the formed honeycomb structure 101. The plugging can be performed only at the ends of the cells, although in some embodiments, plugs can be present at locations within the cell channels of the honeycomb structure that are spaced from the end faces. In some embodiments, the plugs 112 extend along the channels to a depth (e.g., axial length, with respect to the longitudinal axis of the honeycomb structure) of about 3 to 25 mm, although other depths can be used. A portion of the cells on the outlet end 104 but not corresponding to those on the inlet end 102 may also be plugged in a similar pattern. Therefore, each of the cells 108, 110 is preferably plugged only at one end. The preferred arrangement is to therefore have every other cell on a given face plugged as in a checkered pattern as shown in FIG. 1A. Further, the inlet and outlet channels can be any desired shape, such as rectangular, triangular, circular, ellipsoidal, hexagonal, octagonal, or other polygon, optionally with chamfered, rounded, or filleted corners. However, in the exemplified embodiment shown in FIG. 1A, the cell channels are square in cross-sectional shape.

Referring again to FIG. 1A, once the honeycomb structure 101 is formed, the plugged wall flow filter 100 can be made through the creation of the end plugs 112. In particular, the end plugs 112 can employ the cement mixtures of the disclosure. The cement mixtures of the disclosure comprise: (i) inorganic ceramic particles; (ii) an inorganic binder; (iii) an organic binder comprising one or more of a hydrophilic polymer and a hydrophilic additive; and (iv) an aqueous liquid vehicle. In embodiments of the cement mixtures of the disclosure, the organic binder is a hydrophilic polymer that can comprise one or more of hydroxyethyl cellulose (HEC), methyl cellulose, polyethylene oxide (PEO) (e.g., at a molecular weight (MW) from about 300,000 to about 8,000,000), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate. In some implementations of the cement mixtures of the disclosure, the organic binder of the cement mixture is a hydrophilic additive that comprises one or more of polyethylene oxide (PEO), polyvinylpyrrolidone (PVP), xanthan gum, a PEO-polypropylene oxide (PPO) block copolymer, and PPO. In an embodiment of the cement mixtures of the disclosure, e.g., as employed in end plugs 112 shown in FIG. 1A, the organic binder comprises one of: (a) HEC; (b) PEO; (c) HEC and PEO; and (d) methyl cellulose and PEO.

The inorganic ceramic particles of the cement mixtures of the disclosure, e.g., as used for the end plugs 112 shown in FIG. 1A, can be comprised of materials and precursors suitable for firing or heat treatment into a ceramic form and/or as-fired ceramic particles that require no additional firing or heat treatment. In embodiments, the inorganic ceramic particles employed in the cement mixtures of the disclosure comprise a combination of inorganic components sufficient to form a desired sintered (as-fired) phase ceramic composition, including for example a predominantly sintered phase composition comprised of ceramic, glass-ceramic, glass, and combinations thereof. Exemplary and non-limiting inorganic materials suitable for use in these inorganic ceramic particles can include cordierite, aluminum titanate, mullite, clay, kaolin, magnesium oxide sources, talc, zircon, zirconia, spinel, alumina forming sources, including aluminas and their precursors, silica forming sources, including silicas and their precursors, silicates, aluminates, lithium aluminosilicates, alumina silica, feldspar, titania, fused silica, nitrides, carbides, borides, e.g., silicon carbide, silicon nitride or mixtures of these materials.

For example, in one embodiment, the inorganic ceramic particles of the cement mixtures of the disclosure can comprise a mixture of cordierite-forming components (i.e., in a green state) that can be heated under conditions effective to provide a sintered phase cordierite composition. According to this embodiment, the inorganic ceramic particles can comprise a magnesium oxide source; an alumina source; and a silica source. For example, and without limitation, the inorganic ceramic particles can be selected to provide a cordierite composition consisting essentially of from about 49 to about 53 percent by weight $SiO_2$, from about 33 to about 38 percent by weight $Al_2O_3$, and from about 12 to about 16 percent by weight MgO. An exemplary inorganic cordierite precursor composition can comprise about 33 to about 41 weight percent aluminum oxide source, about 46 to about 53 weight percent of a silica source, and about 11 to about 17 weight percent of a magnesium oxide source. Exemplary non-limiting inorganic ceramic particle compositions suitable for forming cordierite include those disclosed in U.S. Pat. Nos. 3,885,977; RE 38,888; 6,368,992; 6,319,870; 6,210,626; 5,183,608; 5,258,150; 6,432,856; 6,773,657; and 6,864,198; and U.S. Patent Application Publication Nos.: 2004/0029707 and 2004/0261384, the entire disclosures of which are incorporated by reference herein.

In an alternative embodiment, the inorganic ceramic particles of the cement mixtures of the disclosure can comprise a mixture of aluminum titanate-forming components (i.e., in a green state) that can be heated under conditions effective to provide a sintered phase aluminum titanate composition. In accordance with this embodiment, the inorganic ceramic particles can comprise powdered raw materials, including an alumina source, a silica source, and a titania source. These inorganic powdered raw materials can, for example, be selected in amounts suitable to provide a sintered phase aluminum titanate ceramic composition comprising, as characterized in an oxide weight percent basis, from about 8 to about 15 percent by weight $SiO_2$, from about 45 to about 53 percent by weight $Al_2O_3$, and from about 27 to about 33 percent by weight $TiO_2$. An exemplary inorganic aluminum titanate precursor composition can comprise approximately 10% quartz; approximately 47% alumina; approximately 30% titania; and approximately 13% additional inorganic additives. Additional exemplary non-limiting inorganic ceramic particles suitable for forming aluminum titanate include those disclosed in U.S. Pat. Nos. 4,483,944; 4,855,265; 5,290,739; 6,620,751; 6,942,713; and 6,849,181; U.S. Patent Application Publication Nos.: 2004/0020846 and 2004/0092381; and PCT Application Publication Nos.: WO 2006/015240; WO 2005/046840; and WO 2004/011386, the entire disclosures of the aforementioned references are incorporated by reference.

The inorganic ceramic particles employed in the cement mixtures of the disclosure (e.g., as used in end plugs 112 shown in FIG. 1A), can comprise as-fired ceramic powders that require no additional firing or heat treatment, i.e., inorganic refractory compositions that have been previously fired, heat treated or otherwise subjected to a ceramming treatment. Exemplary cerammed inorganic refractory compositions suitable for use in the inorganic ceramic particles comprise: silicon carbide, silicon nitride, aluminum titanate, mullite, calcium aluminate, and cordierite. According to one embodiment of the cement mixtures of the disclosure, the inorganic ceramic particles comprise a fired cordierite composition. Suitable cerammed cordierite compositions for use in the inorganic ceramic particles can be obtained commercially from known sources, including for example, Corning Incorporated, Corning, N.Y., USA. Alternatively, a suitable cordierite composition can also be manufactured by heating a cordierite forming batch composition, under conditions effective to convert the batch composition into a sintered phase cordierite. In one embodiment, a suitable cerammed cordierite consists essentially of from about 49 to about 53 percent by weight $SiO_2$, from about 33 to about 38 percent by weight $Al_2O_3$, and from about 12 to about 16 percent by weight MgO.

As noted earlier, the cement mixtures of the disclosure possess a rheological behavior with viscosity levels that can vary as a function of shear rate, which aid in the formation of a wall flow filter with a combination of high quality plugs and increased plug depths and facilitate the use of inorganic ceramic particles and/or powder, such as cordierite, with varying particle size distributions. In some implementations of the cement mixtures of the disclosure, the cordierite particles have a median particle size $d_{50}$ in the range of from about 0.1 μm to about 250 from about 1 μm to about 150 or from about 10 μm to about 45 μm. In another embodiment, the powdered cordierite component can comprise a blend of two or more cordierite compositions, each having differing median particle sizes.

The cement mixtures of the disclosure comprise one or more additive components, such as an inorganic binder. The "inorganic binder" employed in the cement mixtures of the disclosure can be in the form of an aqueous dispersion of inorganic particles. Such an aqueous dispersion can comprise, for example, from about 30 wt. % to 70 wt. % inorganic particles in water. For example, in one embodiment, the cement mixture comprises an inorganic binder, such as for example, a borosilicate glass particles in water, e.g., from about 30 wt. % to 70 wt. % particles in water. Other exemplary inorganic binders include colloidal silica and/or colloidal alumina, e.g., from about 30 wt. % to 70 wt. % particles in water.

The cement mixtures of the disclosure also comprise a liquid vehicle. One liquid vehicle for providing a flow-able or paste-like consistency to the cement mixtures of the disclosure is water, although other liquid vehicles exhibiting solvent action with respect to suitable temporary organic binders can be used. The amount of the liquid vehicle component can vary in order to impart optimum handling properties and compatibility with the other components in the ceramic batch mixture. In some embodiments, the liquid vehicle content is an aqueous liquid vehicle.

Still referring to the cement mixtures of the disclosure, each comprise: (i) inorganic ceramic particles; (ii) an inorganic binder; (iii) an organic binder comprising one or more of a hydrophilic polymer and a hydrophilic additive; and (iv) an aqueous liquid vehicle. In embodiments, the inorganic ceramic powder is present in the cement mixture at a relatively high percentage by weight of the cement mixture (>50% by weight), with the inorganic binder, organic binder and liquid vehicle being present as additional components of the mixture at relatively lower weight percentages. In some embodiments, for example, the cement mixture comprises: (i) an inorganic ceramic powder at 55% to 70% by weight; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to embodiments of the cement mixtures of the disclosure, the inorganic ceramic powder is present in the cement mixture at from 45% to 80% by weight, from 50% to 75% by weight, or from 55% to 70% by weight. Embodiments of these cement mixtures include an inorganic ceramic powder at 45%, 50%, 55%, 60%, 65%, 70%, 75%, or 80% by weight, including all ranges and sub-ranges between the foregoing levels.

Implementations of the cement mixtures of the disclosure comprise an aqueous liquid vehicle in the range of from 5% to 35%, 10% to 30%, or 15% to 20% by weight. Embodiments of these cement mixtures include an aqueous liquid vehicle at 5%, 10%, 15%, 20%, 25%, 30%, or 35% by weight, including all ranges and sub-ranges between the foregoing levels.

Implementations of the cement mixtures of the disclosure comprise an inorganic binder (i.e., an aqueous dispersion of inorganic particles, such as colloidal silica) in the range of from 5% to 35%, 10% to 30%, or 15% to 20% by weight. Embodiments of these cement mixtures comprise an inorganic binder at 5%, 10%, 15%, 20%, 25%, 30%, or 35% by weight, including all ranges and sub-ranges between the foregoing levels.

Some implementations of the cement mixtures of the disclosure comprise an organic binder at 0.01% to 5%, 0.1% to 3%, or 0.25% to 1.25% by weight. Embodiments of these cement mixtures comprise an organic binder at 0.01%, 0.05%, 0.1%, 0.2%, 0.3%, 0.4%, 0.5%, 0.6%, 0.7%, 0.8%, 0.9%, 1%, 1.25%, 1.5%, 1.75%, 2%, 3%, 4%, or 5% by weight, including all ranges and sub-ranges between the foregoing levels.

In some embodiments of the cement mixtures of the disclosure, the relative amounts of the constituents can be affected by the packing efficiency of the solids in the liquid medium. In such embodiments, the cement mixture comprises a solids component and a liquids component, the solids component comprising the inorganic ceramic powder and the liquids component comprising the inorganic binder, the organic binder and the aqueous liquid vehicle. Further, in these embodiments, the cement mixture exhibits a ratio of the solids component to the liquids component from 0.82:1 to 4:1, from 1:1 to 3:1, or from 1.2:1 to 2.4:1. For example, the ratio of the solids component to the liquids component in the cement mixture can be 0.82:1, 0.9:1, 1:1, 1.2:1, 1.4:1, 1.6:1, 1.8:1, 2:1, 2.2:1, 2.4:1, 2.6:1, 2.8:1, 3:1, 3.5:1, 4:1, and all ratios between these levels.

According to an implementation of the cement mixtures of the disclosure, the organic binder comprises one of: (a) HEC at 0.2% to 0.7%, 0.3% to 0.6%, or 0.35% to 0.53% by weight; (b) PEO at 0.1% to 0.8%, 0.2% to 0.7%, or 0.3% to 0.6% by weight; (c) HEC and PEO at 0.1% to 1% and 0.03% to 0.47%, 0.25% to 0.55% and 0.03% to 0.47%, or 0.35% to 0.45% and 0.03% to 0.47% by weight, respectively; and (d) methyl cellulose and PEO at 0.3% to 8% and 0.03% to 0.47%, 0.4% to 0.7% and 0.03% to 0.47%, or 0.5% to 0.6% and 0.03% to 0.47% by weight, respectively. In some embodiments, the cement mixtures of the disclosure include combinations of the above constituents with weight percentages adjusted based on the relative amounts of one of the constituents relative to the other(s).

The cement mixtures of the disclosure (e.g., as used to form the end plugs 112 shown in FIG. 1A) can be characterized by a rheological profile with viscosity ranges that are controlled independently at the high and low shear rate regimes associated with a process of plugging a honeycomb body. In some implementations, the cement mixture exhibits a cement viscosity of less than 7000 Pa·s at a shear rate of less than 0.1/sec and a cement viscosity of greater than 25 Pa·s at a shear rate from 20/sec to 100/sec, or a cement viscosity of less than 7000 Pa·s at a shear rate of less than 0.2/sec and a cement viscosity of greater than 25 Pa·s at a shear rate from 40/sec to 100/sec. For example, the cement mixture, at a shear rate of less than 0.1/sec, can exhibit a cement viscosity of less than 7000 Pa·s, 6000 Pa·s, 5000 Pa·s, 4000 Pa·s, 3000 Pa·s, 2000 Pa·s, 1000 Pa·s, 500 Pa·s, and all cement viscosities in the foregoing cement viscosity ranges. Further, the cement mixture, at a shear rate from 20/sec to 100/sec, can exhibit a cement viscosity of greater than 25 Pa·s, 20 Pa·s, 15 Pa·s, 10 Pa·s, 5 Pa·s, 1 Pa·s, 0.5 Pa·s, 0.1 Pa·s, 0.05 Pa·s, and all cement viscosities in the foregoing viscosity ranges.

According to some embodiments, the liquids component of the cement mixture (i.e., as excluding the inorganic ceramic powder constituent) of the disclosure can exhibit a liquid viscosity from 50 centipoise (cP) to 1500 cP at a shear rate of 0.001/sec, in which the liquid viscosity is measured from a wet mixture of (ii) the inorganic binder, (iii) the organic binder comprising one or more of a hydrophilic polymer and a hydrophilic additive, and (iv) the aqueous liquid vehicle, which excludes (i) the inorganic ceramic powder. The liquids component of the cement mixture can also exhibit a liquid viscosity from 100 cP to 1000 cP, or from 100 cP to 600 cP, at a shear rate of 0.001/sec. For example, the liquids component of the cement mixture can exhibit a liquid viscosity of 50 cP, 100 cP, 200 cP, 300 cP, 400 cP, 500 cP, 600 cP, 700 cP, 800 cP, 900 cP, 1000 cP, 1100 cP, 1200 cP, 1300 cP, 1400 cP, 1500 cP, and all liquid viscosities and sub-ranges between these viscosity levels.

Figure 1C:
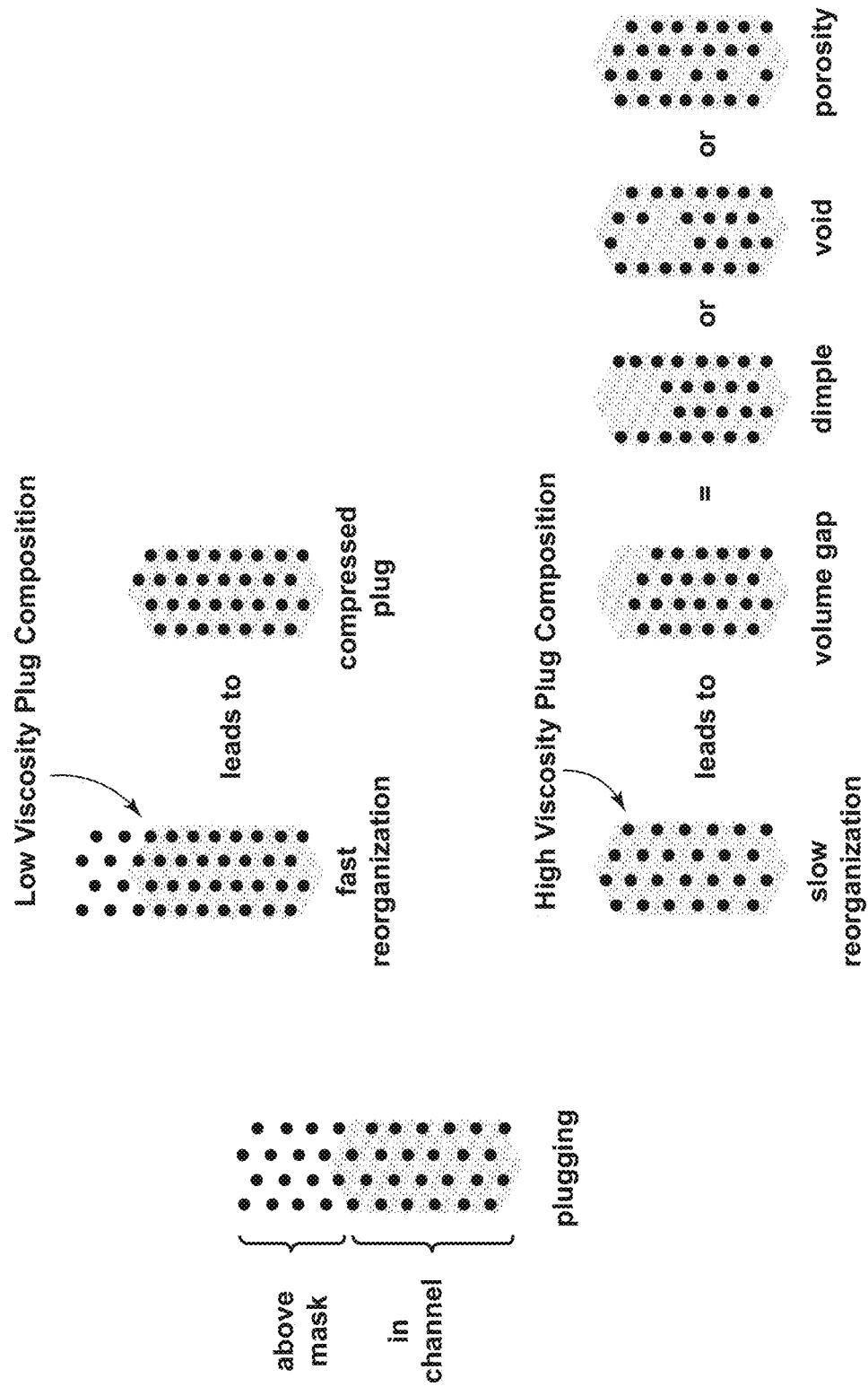
FIG. 1C is a schematic diagram of cement mixtures for applying to a honeycomb body with different fluid viscosities.

Referring now to FIG. 1C, a schematic diagram is provided of cement mixtures suitable for application into a honeycomb body with different fluid viscosities at a low shear rate regime (e.g., at shear rates of <0.001/sec). As shown in the figure, grog (i.e., inorganic ceramic powder) rearrangement is demonstrated for two different types of cement mixtures—(a) one with a low fluids viscosity comparable to those of the disclosure (shown in the top line of the FIG. 1C) and (b) one with a high fluids viscosity comparable to known cement mixtures. At stages of the plugging process with low shear rates, the cement mixture is generally capable of rapid movement of the grog and, therefore, faster rearrangement of the particles as the particles move to pack and form plugs. For a cement mixture with a liquids component having a low liquid viscosity (e.g., <1500 cP) at these shear rates, there is ample time to complete the rearrangement before a mask (as employed in the plugging process) is peeled off of the honeycomb body and therefore a cement reservoir exists to pull particles from, resulting in a more compressed, higher quality plug. In contrast, for a known cement mixture with a high liquid viscosity (e.g., >>1500 cP) at these shear rates, the reservoir cement will be removed before the completion of the grog particle rearrangement. Therefore, the rearrangement will continue but without a reservoir to draw from, there is less grog in the resultant plug. Consequently, a volume gap can form within the plugs, which can be manifested as dimples, voids or undesired porosity as the grog particles in the cement mixture continue to rearrange and pack within the plug. Hence, at low shear rates, the low liquid viscosities of the cement mixtures of the disclosure provide higher mobility within the cement mixture of the plug, resulting in more compact plugs with less prevalence of voids, dimples and porosity.

Figure 2:
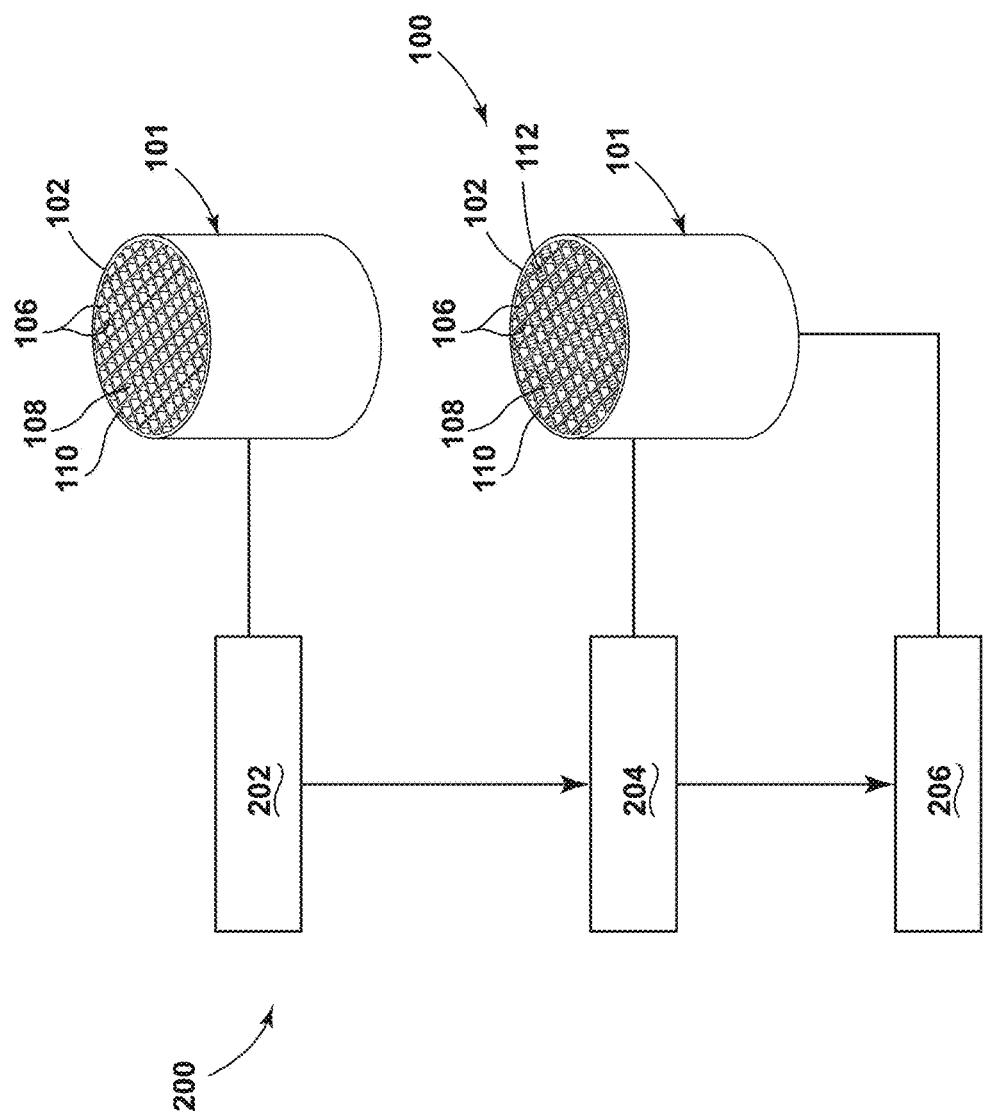
FIG. 2 is a schematic flow chart of a method for manufacturing a porous ceramic wall flow filter, according to an embodiment of the disclosure.
Figure 3A:
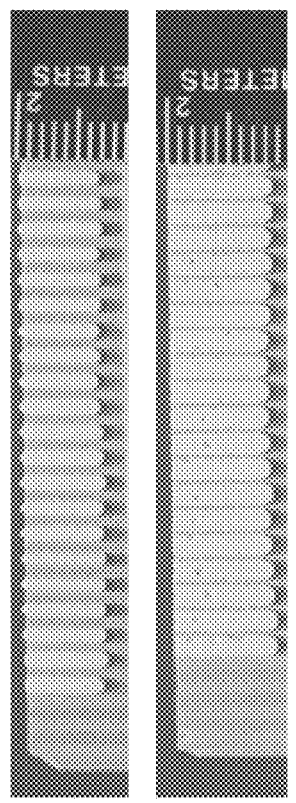
FIGS. 3A-3D are optical micrographs of respective cross-sections of porous ceramic wall flow filters with cement mixtures disposed in their respective cell channels, according to embodiments of the disclosure.
Figure 3B:
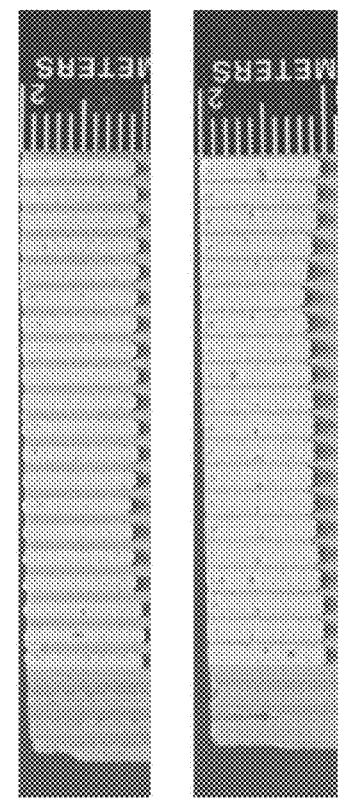
Figure 3C:
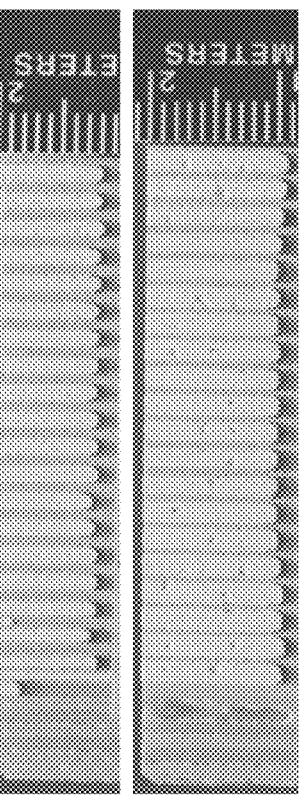
Figure 3D:
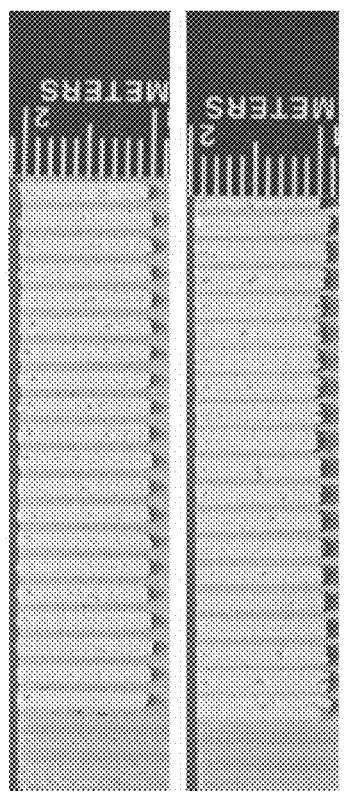

Referring now to FIG. 2, a method 200 for making a porous ceramic wall flow filter (e.g., the wall flow filter 100 shown in FIG. 1A) is provided. The method 200 comprises a step 202 of creating or otherwise providing a ceramic honeycomb structure, such as the honeycomb structure 101 (see FIG. 1A). As shown in FIG. 2, the honeycomb structure 101 comprises a matrix of intersecting porous ceramic walls 106 which form a plurality of inlet cells 108 and outlet cells 110 (also referred to as "channels") bounded by the porous ceramic walls 106 that extend longitudinally from an upstream inlet end 102 to a downstream outlet end 104 (not shown in FIG. 2, see FIG. 1A). For example, the honeycomb structure 101 can be manufactured by extruding a ceramic-forming batch mixture through an extrusion die, cutting a green body to a desired length from the extrudate, and then drying and subsequently firing the cut green body to form the ceramic honeycomb structure 101. In the embodiments described herein, the mixture used to form the honeycomb structure 101 is different than the cement mixtures of the present disclosure used to form plugs in the honeycomb structure 101. For example, the mixture used to form the honeycomb structure 101 will have different components and/or components present in different amounts compared to the cement mixtures used to form the plugs, and may have fewer or more components than the cement mixture.

Referring again to FIG. 2, the method 200 for making a porous ceramic wall flow filter (e.g., the wall flow filter 100 shown in FIG. 1A) further comprises a step 204 of selectively inserting a cement mixture (i.e., any of the cement mixtures detailed in this disclosure) into at least one predetermined cell channel (e.g., inlet or outlet cells or channels 108 and 110) of the ceramic honeycomb structure, such as at opposing ends (e.g., at the inlet end 102 and/or the outlet end 104 of the honeycomb structure 101). For example, the cement mixture can be forced into selected open cells of either a green or an already fired honeycomb structure 101 in the desired plugging pattern and to the desired depth, by one of several known plugging process methods. For example, selected channels can be end plugged as shown in FIGS. 1 and 2 to provide a wall flow filter 100 configuration whereby the flow paths resulting from alternate channel plugging direct a fluid or gas stream entering the upstream inlet end 102 of the exemplified wall flow filter 100, through the porous cell walls 106 prior to exiting the filter at the downstream outlet end 104. The plugging can be effectuated by, for example, using any suitable apparatus and process such as that disclosed and described in U.S. Pat. No. 6,673,300, the content of which is incorporated by reference herein.

As noted earlier, the cement mixture employed in the method 200 depicted in FIG. 2 comprises: (i) inorganic ceramic particles; (ii) an inorganic binder; (iii) an organic binder comprising one or more of a hydrophilic polymer and a hydrophilic additive; and (iv) an aqueous liquid vehicle. Further, the cement mixture disposed in the at least one predetermined cell channel is in the form of at least one respective plug (e.g., plug 112 shown in FIGS. 1 and 2) that blocks or impedes flow of a fluid through the channel (e.g., inlet or outlet cells or channels 108 and 110). In addition, and as noted earlier, the cement mixture can exhibit a viscosity of less than 7000 Pa·s at a shear rate of less than 0.1/sec and a viscosity of greater than 25 Pa·s at a shear rate from 20/sec to 100/sec.

As also depicted in FIG. 2, the method 200 also comprises a step 206 of drying the at least one plug for a period of time sufficient to at least substantially remove the liquid vehicle from the at least one plug. The resulting plugged honeycomb body (e.g., wall flow filter 100) can then be dried, and optionally fired under suitable conditions, as understood by those with ordinary skill in the field of the disclosure, that are effective to convert the plugging mixture into a primary sintered phase ceramic composition. Conditions effective for drying the plugging material comprise those conditions capable of removing at least substantially all of the liquid vehicle present within the plugging mixture. As used herein, at least substantially all includes the removal of at least 95%, at least 98%, at least 99%, or even at least 99.9% of the liquid vehicle present in the plugging mixture. Exemplary and non-limiting drying conditions suitable for removing the liquid vehicle include ambient, room temperature drying and/or heating the end-plugged honeycomb substrate at a temperature of at least 50° C., at least 60° C., at least 70° C., at least 80° C., at least 90° C., at least 100° C., at least 110° C., at least 120° C., at least 130° C., at least 140° C., or even at least 150° C. for a period of time sufficient to at least substantially remove the liquid vehicle from the plugging mixture. In one embodiment, the conditions effective to at least substantially remove the liquid vehicle comprise heating the plugging mixture at a temperature of at least about 60° C. In another embodiment, the end-plugged honeycomb substrate can be heated from about 60° to about 150° C. to remove the liquid vehicle. Further, the heating can be provided by a known method, including for example, hot air drying, or RF and/or microwave drying.

In some embodiments, the cement mixtures described herein are cold set cement mixtures. Accordingly, the drying at step 206 is effective to remove moisture content from the cement mixture, but is not performed at temperatures sufficiently high to cause reactions of any ceramic precursors and/or or sintering of any ceramic materials in the mixture. Thus, the temperature during drying according to some embodiments is at most 1000° C., at most 800° C., at most 600° C., or even at most 500° C. In some embodiments, the drying temperature is insufficient to cause reaction of any ceramic precursors in the cement mixture. In some embodiments, the drying temperature is insufficient to cause sintering of ceramic materials in the cement mixture. In this manner, the cold set cement mixtures of the present disclosure can be applied to ceramic honeycomb structures that have already been fired, rather than green honeycomb structures. Applying the cold set cement mixtures of the present disclosure to fired, ceramic honeycomb structures can provide advantages in processing time and/or costs and can avoid issues in plug quality that may arise when the honeycomb structure is fired after plugging. In addition, it is noted that at higher drying temperatures, pyrolysis of at least a portion of the organic material present in the plugging material may occur during the drying step 206, based on the drying temperature and the type of organic material present.

Thus, in some embodiments, the relative amount of organic material present in the dried plugging material may be different than that of the cement mixture used to form the plug.

An example of a type of conventional diesel filter includes a ceramic honeycomb structure with alternating cell channels blocked to form an exhaust gas flow in a predetermined pattern. The inlet cell channels can be blocked opposite of the outlet cell channels to provide a pathway for the exhaust gas which forces the gas to flow through the porous wall of the honeycomb structure, as described herein. The porous walls of the honeycomb structure can thereby act as a filter allowing gas to flow through, while trapping soot and/or ash particles. The particles (e.g., soot and/or ash) accumulates during use and eventually requires replacement or regeneration of the filter. One configuration for prolonging the cycle life of this type of particulate filter utilizes an asymmetric cell geometry (e.g., as shown in FIG. 1B) in which a cross-sectional area, or hydraulic diameter, of the inlet cell channels (i.e., the cell channels not blocked on the inlet end of the filter) is larger than a cross-sectional area, or hydraulic diameter, of the outlet cell channels (i.e., the cell channels not blocked on the outlet end of the filter). The larger cross-sectional diameter inlet cell channels can allow for an increased amount of soot and ash storage before regeneration and/or cleaning of the filter. For example, a ratio of the inlet cell channel cross-sectional diameter to the outlet cell channel cross-sectional diameter ("inlet:outlet") can be about 1.3:1 and in some examples as much as about 1.5:1.

However, the asymmetric cell geometries can present challenges in the process of forming plugs in cell channels on both the inlet end and the outlet end of the filter. Typically, the cell channels are plugged as described above by forcing a cement mixture into the desired cell channels under pressure. Without being bound by any particular theory, in general, during the channel plugging process the initial cement mixture can be considered as including a grog having a particle size distribution and a viscous liquid vehicle. Characteristics of the cement mixture, such as particle size, viscosity (e.g., organic content), and liquid content (e.g., solid load), can be selected to provide a plug having a desired depth and quality based on the dimensions of the cell channel to be plugged. For example, a slip casting rate of the grog can be reduced to facilitate the formation of deeper plugs by reducing the permeability of the grog (e.g., smaller particles) or increased viscosity (e.g., higher organic content). In another example, the addition of more liquid to the cement mixture is generally expected to result in deeper plugs because there is more liquid that needs to be removed before a critical solid load is achieved and further travel of the plugging mixture ceases. For single diameter filters (i.e., having symmetric cell geometries of the same size), a particular cement mixture can be used to plug both the desired cell channels on both the inlet end and the outlet end of the filter to achieve a particular plug depth and quality. However, for asymmetric cell geometries, it can be challenging to use the same cement mixture to achieve a desired plug depth and plug quality in both the smaller cell channels (open at the outlet end of the filter) and the larger cell channels (open at the inlet end of the filter).

For example, in some asymmetric cell geometries, it can be challenging to prepare a single cement mixture that can achieve a desired plug depth and quality in both the smaller cell channels and the larger cell channels. One method of achieving a desired plug depth in a small cell channel (relative to a larger cell channel) is to increase a liquid viscosity of the cement mixture. However, increasing the liquid viscosity may result in an increase in the amount of liquid vehicle needed to keep the cement viscosity of the mixture within a predetermined range suitable for processing. As the amount of liquid in the cement mixture is increased, the particles may move farther apart, which can result in an increase in consolidation during and/or after plugging. In this scenario, the higher pressure needed to achieve a desired plug depth in the smaller cell channels, in combination with the increased liquid viscosity, can facilitate consolidation of the cement mixture during the plugging process, which can improve the quality of the plug. However, the larger cell channels will require a lower pressure than the smaller cell channel to achieve the same plug depth. When the same cement mixture is used to plug both the small and large cell channels, the lower plugging pressure used to plug the large cell channels can reduce slip casting and consolidation during plugging (compared to the smaller cell channels). The unconsolidated plug then consolidates to the cell channel wall during drying, which can result in voids and dimples within the plugs formed in the large cell channels. Thus, in some applications, two different cement mixtures may be required for forming plugs in both the smaller cell channels on the inlet end of the filter and the larger cell channels on the outlet end of the filter to achieve a desired plug depth and quality on both ends of the filter. The use of two different plugging cement compositions to plug asymmetric cell geometries can increase production costs and/or time.

As discussed above, the cement mixtures of the present disclosure can enable a broad plugging process window which can achieve a desired combination of plug depth and plug quality at plug depths approaching maximum achievable plug depths. Further, the cement mixtures of the present disclosure can enable plugging of wall flow filters with varying, asymmetric channel sizes with a single cement mixture composition. Embodiments of the present disclosure can be used to provide plugs having a suitable depth and quality on both the small cell channels on the inlet end and the large cell channels on the outlet end of a honeycomb structure having an asymmetric cell geometry. In some embodiments of the present disclosure, the cement mixture can include: (i) inorganic ceramic particles; (ii) an inorganic binder; (iii) an organic binder containing a hydrophilic polymer and a hydrophilic additive including a polymer with a different composition than the composition of the hydrophilic polymer, the additive having a weight average molecular weight ($M_w$) of at least 1,000,000 g/mol; and (iv) an aqueous liquid vehicle.

The inorganic ceramic particles, inorganic binder, and aqueous liquid vehicle can be any of the materials disclosed in the present disclosure and may be present in an amount and/or within a range of amounts as described in the present disclosure.

In some embodiments, the inorganic ceramic particles are present in the cement mixture at from about 40 wt % to about 80 wt %. For example, the inorganic ceramic particles can be present in the mixture in an amount of from about 40 wt % to about 80 wt %, about 40 wt % to about 70 wt %, about 40 wt % to about 60 wt %, about 40 wt % to about 50 wt %, about 45 wt % to about 80 wt %, about 45 wt % to about 70 wt %, about 45 wt % to about 60 wt %, about 45 wt % to about 50 wt %, about 50 wt % to about 80 wt %, about 50 wt % to about 70 wt %, about 50 wt % to about 60 wt %, about 40 wt % to about 55 wt %, or about 45 wt % to about 55 wt %.

The hydrophilic polymer of the organic binder component can be hydroxyethyl cellulose (HEC), methyl cellulose, carboxymethyl cellulose, hydroxypropyl cellulose, polysaccharides, modified cellulose, or a combination thereof. In some embodiments, the hydrophilic polymer can be present in an amount of from about 0.5 wt % to about 1.5 wt %. For example, the hydrophilic polymer can be present in an amount of from about 0.5 wt % to about 1.5 wt %, about 0.6 wt % to about 1.5 wt %, about 0.7 wt % to about 1.5 wt %, about 0.75 wt % to about 1.5 wt %, about 0.8 wt % to about 1.5 wt %, about 0.9 wt % to about 1.5 wt %, about 1.0 wt % to about 1.5 wt %, about 1.25 wt % to about 1.5 wt %, about 0.5 wt % to about 1.25 wt %, about 0.6 wt % to about 1.25 wt %, about 0.7 wt % to about 1.25 wt %, about 0.75 wt % to about 1.25 wt %, about 0.8 wt % to about 1.25 wt %, about 0.9 wt % to about 1.25 wt %, about 1.0 wt % to about 1.25 wt %, about 0.5 wt % to about 1.0 wt %, about 0.6 wt % to about 1.0 wt %, about 0.7 wt % to about 1.0 wt %, about 0.75 wt % to about 1.0 wt %, or about 0.8 wt % to about 1.0 wt %. In some examples, the hydrophilic polymer can be present at about 0.5 wt %, about 0.75 wt %, about 1.0 wt %, about 1.25 wt %, about 1.5 wt %, or any amount between these values.

The hydrophilic additive of the organic binder component can include at least one polymer selected from polyethylene oxide (PEO), polyvinylpyrrolidone (PVP), a PEO-polypropylene oxide (PPO) block copolymer, polypropylene oxide (PPO), or combinations thereof. The hydrophilic additive has a weight average molecular weight ($M_w$) of at least 1,000,000 g/mol, and thus is also referred to herein as a high molecular weight hydrophilic additive. In some embodiments, the hydrophilic additive has a weight average molecular weight of at least 1,000,000 g/mol, at least 1,500,000 g/mol, at least 2,000,000 g/mol, at least 3,000,000 g/mol, or at least 5,000,000 g/mol. For example, the hydrophilic additive can have a weight average molecular weight of from about 1,000,000 g/mol to about 8,000,000 g/mol, about 1,000,000 g/mol to about 7,000,000 g/mol, about 1,000,000 g/mol to about 5,000,000 g/mol, about 1,000,000 g/mol to about 3,000,000 g/mol, about 1,000,000 g/mol to about 2,000,000 g/mol, about 1,500,000 g/mol to about 8,000,000 g/mol, about 1,500,000 g/mol to about 7,000,000 g/mol, about 1,500,000 g/mol to about 5,000,000 g/mol, about 1,500,000 g/mol to about 3,000,000 g/mol, about 1,500,000 g/mol to about 2,000,000 g/mol, about 2,000,000 g/mol to about 8,000,000 g/mol, about 2,000,000 g/mol to about 7,000,000 g/mol, about 2,000,000 g/mol to about 5,000,000 g/mol, about 2,000,000 g/mol to about 3,000,000 g/mol, about 3,000,000 g/mol to about 8,000,000 g/mol, about 3,000,000 g/mol to about 7,000,000 g/mol, about 3,000,000 g/mol to about 5,000,000 g/mol, or about 5,000,000 g/mol to about 8,000,000 g/mol. As used herein, weight average molecular weight refers to the average polymer molecular weight as measured using light scattering techniques. It will be understood that some polymers may be measured using other methods, such as based on viscosity (e.g., viscosity average molecular weight $M_v$) or measured using chromatography techniques (e.g., number average molecular weight $M_n$) and appropriate scaling may be used to estimate the weight average molecular weight of the polymer.

The high molecular weight hydrophilic additive can be present in an amount of from about 0.1 wt % to about 0.5 wt %. For example, the high molecular weight hydrophilic additive can be present in an amount of from about 0.1 wt % to about 0.5 wt %, about 0.2 wt % to about 0.5 wt %, about 0.3 wt % to about 0.5 wt %, about 0.4 wt % to about 0.5 wt %, about 0.1 wt % to about 0.4 wt %, about 0.2 wt % to about 0.4 wt %, about 0.3 wt % to about 0.4 wt %, about 0.1 wt % to about 0.3 wt %, or about 0.2 wt % to about 0.3 wt %. In some examples, the high molecular weight hydrophilic additive can be present in an amount of about 0.1 wt %, about 0.2 wt %, about 0.25 wt %, about 0.3 wt %, about 0.4 wt %, about 0.5 wt %, or any amount between these values.

One exemplary cement mixture includes from about 40 wt % to about 50 wt % solids component (i.e., inorganic ceramic particles), from about 0.5 wt % to about 1.5 wt % of the hydrophilic polymer, from about 0.1 wt % to about 0.5 wt % of the high molecular weight hydrophilic additive, and from about 20 wt % to about 30 wt % of an aqueous liquid vehicle. Another exemplary cement mixture includes from about 40 wt % to about 50 wt % solids component (i.e., inorganic ceramic particles), from about 0.6 wt % to about 1 wt % of the hydrophilic polymer, from about 0.2 wt % to about 0.25 wt % of the high molecular weight hydrophilic additive, and from about 20 wt % to about 30 wt % of an aqueous liquid vehicle.

The cement mixture including an organic binder containing a hydrophilic polymer and a high molecular weight hydrophilic additive having a weight average molecular weight ($M_w$) of at least 1,000,000 g/mol can be used in a method of making a porous ceramic wall flow filter, such as the wall flow filter 100 shown in FIG. 1A, in a manner similar to that described above with respect to the method 200 of FIG. 2. In one embodiment, the cement mixture can be selectively inserted into an end (e.g., at the inlet end 102 or outlet end 104 of the honeycomb structure 101) of at least one predetermined cell channel (e.g., inlet or outlet cells or channels 108 and 110) of a ceramic honeycomb structure. As described above, the cement mixture can be disposed in the at least one predetermined cell channel in the form of a plug that blocks the respective cell channel. The cement mixture can be used to plug cell channels (e.g., inlet or outlet cells or channels 108 and 110) at the upstream inlet end 102 and/or the downstream outlet end 104 of the wall flow filter 100. The wall flow filter 100 can have a symmetric or asymmetric cell geometry, and the inlet and/or outlet cell channels 108 and 110 can be plugged according to any desired pattern. As discussed above with respect to the method 200 of FIG. 2, after the cement mixture is inserted into the desired cell channels, the plugs can then be dried for a period of time sufficient to at least substantially remove the aqueous liquid vehicle from the plugs.

In one exemplary embodiment, the cement mixture including an organic binder containing a hydrophilic polymer and a hydrophilic additive having a weight average molecular weight ($M_w$) of at least 1,000,000 g/mol can be used to plug cell channels in a wall flow filter having an asymmetric cell geometry. For example, the cement mixture can be inserted into at least a portion of the upstream inlet ends of a first plurality of cell channels and inserted into at least a portion of the downstream outlet ends of a second plurality of cell channels. The first plurality of cell channels can have a cross-sectional area, or hydraulic diameter, that is smaller than the cross-sectional area, or hydraulic diameter, of the second plurality of cells, such as due to at least one cross-sectional dimension of the first plurality of cells being smaller than a corresponding cross-sectional dimension of the second plurality of cell channels. The first plurality of cell channels can be referred to as the "small cell channels" and the second plurality of cell channels can be referred to as the "large cell channels." The cement mixture can form a plug that blocks the respective cell channel in the upstream inlet ends of the small cell channels and the downstream outlet ends of the large cell channels. The plugs can then be dried as described above with respect to the method 200 of FIG. 2. While it is within the scope of the present disclosure for a different cement mixture to be used to plug the upstream inlet ends and the downstream outlet ends of a wall flow filter, the embodiments of the present disclosure provide cement mixtures in which the same cement mixture composition can be used to plug both the upstream inlet ends and the downstream outlet ends of a wall flow filter having an asymmetric cell geometry to provide plugs having a desired depth and quality at both ends of the wall flow filter.

Conventional cement compositions used for forming plugs often include an organic binder component that includes an organic, hydrophilic polymer, such as hydroxyethyl cellulose (HEC), methyl cellulose, carboxymethyl cellulose, hydroxypropyl cellulose, polysaccharides, or modified cellulose. Embodiments of the present disclosure provide a cement composition in which a high molecular weight hydrophilic additive is added to or used to partially replace some of the organic, hydrophilic polymer conventionally present in a cement plug composition. The addition of the high molecular weight hydrophilic additive can affect the liquid viscosity and/or slip cast behavior of the cement composition. Without wishing to be limited by any particular theory, it has been found that a small amount of a high molecular weight hydrophilic additive, i.e., a hydrophilic additive as described above having a weight average molecular weight ($M_w$) of at least 1,000,000 g/mol, can be effective in reducing the slip cast rate of a cement composition at least in part due to the reduced ability of such high molecular weight additives to flow through the grog particles of the cement composition. In addition, the relatively low amounts of the high molecular weight additives may enable the liquid and cement viscosities in the cement composition to stay low, even at elevated solid loading. These effects can result in an increased plug depth capability of the cement composition (e.g., due to the reduced slip cast rate) and an increase in plug quality, such as fewer and/or smaller voids, due to the increased solid load, in combination with lower shrinkage. These characteristics can be manipulated to provide a single cement composition that can be used to provide a desired depth and quality of plug on both the inlet and outlet ends of a honeycomb structure having an asymmetric cell geometry. In some embodiments, an organic binder that is a combination of a hydrophilic polymer and a hydrophilic additive having a weight average molecular weight ($M_w$) of at least 1,000,000 g/mol can produce a cement composition capable of achieving a given plug depth with lower shrinkage (i.e., less void and dimple formation) at a lower total level of organic material and a higher solid load compared to a comparable cement composition that includes an organic binder containing a similar hydrophilic polymer in the absence of the hydrophilic additive. The cement mixture according to some embodiments of the present disclosure which include an organic binder containing a hydrophilic polymer and a hydrophilic additive having a weight average molecular weight ($M_w$) of at least 1,000,000 g/mol, can provide several advantages compared to a cement mixture that does not include the high molecular weight hydrophilic additive having a weight average molecular weight ($M_w$) of at least 1,000,000 g/mol. For example, the addition of the a high molecular weight polymer additive (such as PEO) in combination with a traditional methyl cellulose organic binder can provide an increase plug depth capability and/or reduced cement shrinkage during drying. The high molecular weight additive can increase the achievable depth of the plug due to the high molecular weight and the entanglement of the additive that reduces the slip casting rate. The high molecular weight additive also reduces the slip casting rate of the cement mixture, and can also facilitate a higher solid load with reduced shrinkage during drying, which can reduce the formation of voids and dimples that can decrease the plug quality. The reduction in slip casting rate and the higher solid loading ability can be particularly advantageous in forming plugs in cell channels having different cross-sectional dimensions (e.g., asymmetric cell geometries). The cement mixture according to some embodiments of the present disclosure, which includes an organic binder containing a hydrophilic polymer and a hydrophilic additive having a weight average molecular weight ($M_w$) of at least 1,000,000 g/mol, can be used in plugging asymmetric cell geometries with a single cement mixture composition that balances obtaining the desired plug depth in the small cell channels and the improved plug quality in the large cell channels.

EXAMPLES

To further illustrate the principles of the disclosure, the following examples are put forth so as to provide those of ordinary skill in the art with a complete disclosure and description of how the cement mixtures and methods claimed herein are made and evaluated. They are intended to be purely exemplary of the cement mixtures and methods of the disclosure, and are not intended to limit the scope of what the inventors regard as their invention. Unless indicated otherwise, parts are parts by weight, the drying temperature is 75° C. or ambient temperature, and pressure is at or near atmospheric.

Example 1

In this example, honeycomb structures with asymmetric cell geometries, e.g., as generally shown in FIG. 1B, were plugged with cement mixtures and methods according to principles of the disclosure. The honeycomb structures of this example are asymmetric in the sense that the adjacent cell channels at each of the inlet and outlet ends of the structure have differing dimensions in cross-section. In other words, adjacent cell channels have different cross-sectional flow areas (which may be alternatively referred to as hydraulic diameters), such that there are relatively "small cell channels" and "large cell channels" as described herein. In particular, alternating cells of the honeycomb structures according to Example 1 have square cross-sectional dimensions of from about 1 to 1.1 mm for the small channels and of from about 1.3 mm to 1.4 mm for the large channels. Ex. 1 was provided with methylcellulose instead of HEC and/or PEO used in Ex. 1A-1C. The composition of the cement mixtures employed in this example to form the plugs in these honeycomb structures are detailed below in Table 1 (i.e., Ex. 1, Ex. 1A, Ex. 1B and Ex. 1C). The plugging pressures employed in this example are 20 psi and 10 psi for the larger and smaller cell channels, respectively.

TABLE 1

| | Component (wt. % of cement mixture) | | | |
| --- | --- | --- | --- | --- |
| | Ex. 1 | Ex. 1A | Ex. 1B | Ex. 1C |
| inorganic ceramic powder | 62.121% cordierite | 62.21% cordierite | 64.22% cordierite | 64.13% cordierite |
| inorganic binder (aq. colloidal silica, 50 wt. % particles) | 18.63% $SiO_2$ | 18.66% $SiO_2$ | 17.61% $SiO_2$ | 17.58% $SiO_2$ |
| organic binder | 0.62% methyl cellulose | 0.47% HEC | 0.44% HEC 0.12% PEO | 0.59% methyl cellulose 0.12% PEO |

TABLE 1-continued

| | Component (wt. % of cement mixture) | | | |
|---|---|---|---|---|
| | Ex. 1 | Ex. 1A | Ex. 1B | Ex. 1C |
| liquid vehicle | 18.63% $H_2O$ | 18.66% $H_2O$ | 17.61% $H_2O$ | 17.58% $H_2O$ |
| Maximum plug depth, $PD_{max}$ | 7.0 mm | 8.0 mm | 18.7 mm | 16.7 mm |

Referring now to FIGS. 3A-3D, optical micrographs of respective cross-sections of porous ceramic wall flow filters with the cement mixtures of Table 1 disposed in their respective cell channels are provided. As is evident from the figures, the porous ceramic wall flow filters plugged with cement mixtures having an organic binder that comprises PEO exhibit a 15% to 40% increase in maximum plug depth ($PD_{max}$) (see FIGS. 3C and 3D, and Exs. 1B and 1C in Table 1, respectively) relative to the wall flow filters with plugs having a cement mixture that lacks PEO (see FIGS. 3A and 3B, and Ex. 1A, and Ex. 1, respectively), all as plugged at the same pressures. It is evident from this example that cement mixtures of the disclosure can be employed to provide plugs with a significant depth and quality in honeycomb structures with asymmetric geometries at a particular plugging pressure.

Example 2

In this example, honeycomb structures were plugged to obtain relatively short plugging depths. Shorter plugs with large cell diameters can be problematic from a processing stand point as shorter plug depths may be achieved by using a fraction of the available plugging pressure associated with longer plugs. At these lower plugging pressure levels, known cement mixtures may result in less compressed or compacted plugs than plugs that are plugged at longer depths with higher plugging pressures. Known cement mixtures, when employed to produce shorter plugs, may result in plugs with lower plug strengths due to lower particle packing, and lower quality levels due to voids and other defects.

Figure 5A:
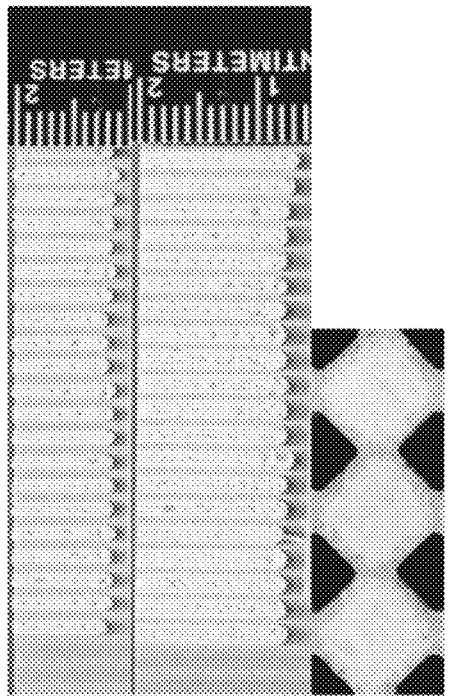
FIGS. 5A-5D are optical micrographs of respective cross-sections of porous ceramic wall flow filters with cement mixtures disposed in their respective cell channels, according to embodiments of the disclosure.
Figure 5C:
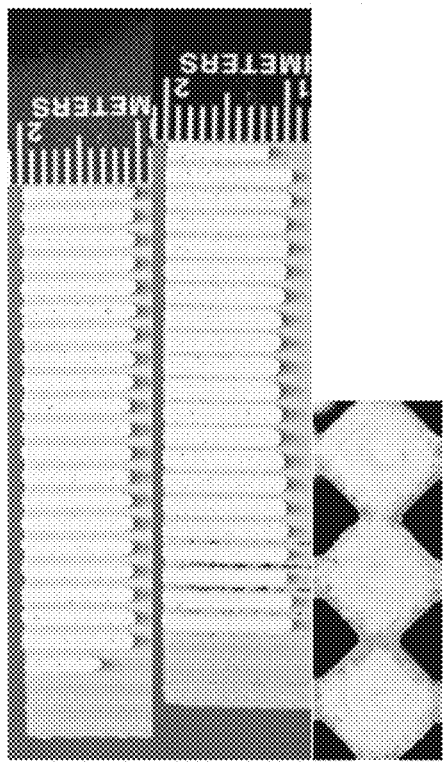
Figure 5B:
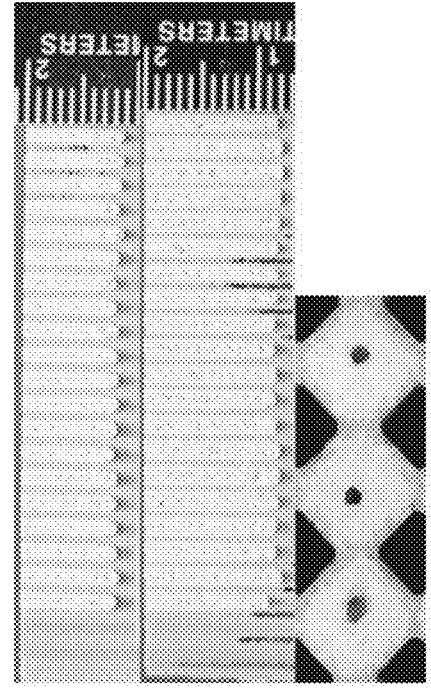
Figure 5D:
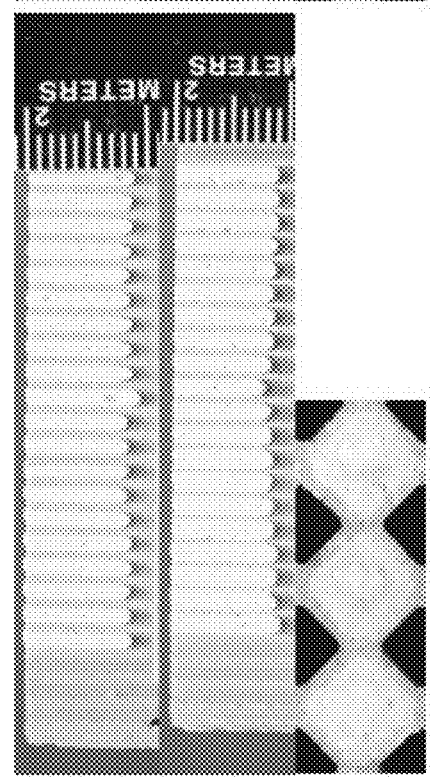

The honeycomb structures of this example are symmetric in the sense that the adjacent cell channels at each of the inlet and outlet ends of the structure have the same dimensions. In particular, cells of these honeycomb structures have square cross-sectional dimensions between about 1.0 mm and 1.4 mm. The composition of the cement mixtures employed in this example to form the plugs in these honeycomb structures are detailed above in Table 1 (i.e., Ex. 1 and Ex. 1B). Further, some of the as-plugged samples of this example were air dried (see FIGS. 5C and 5D) and the others were dried at 75° C. in an oven (see FIGS. 5A and 5B, outlined below).

Figure 4A:
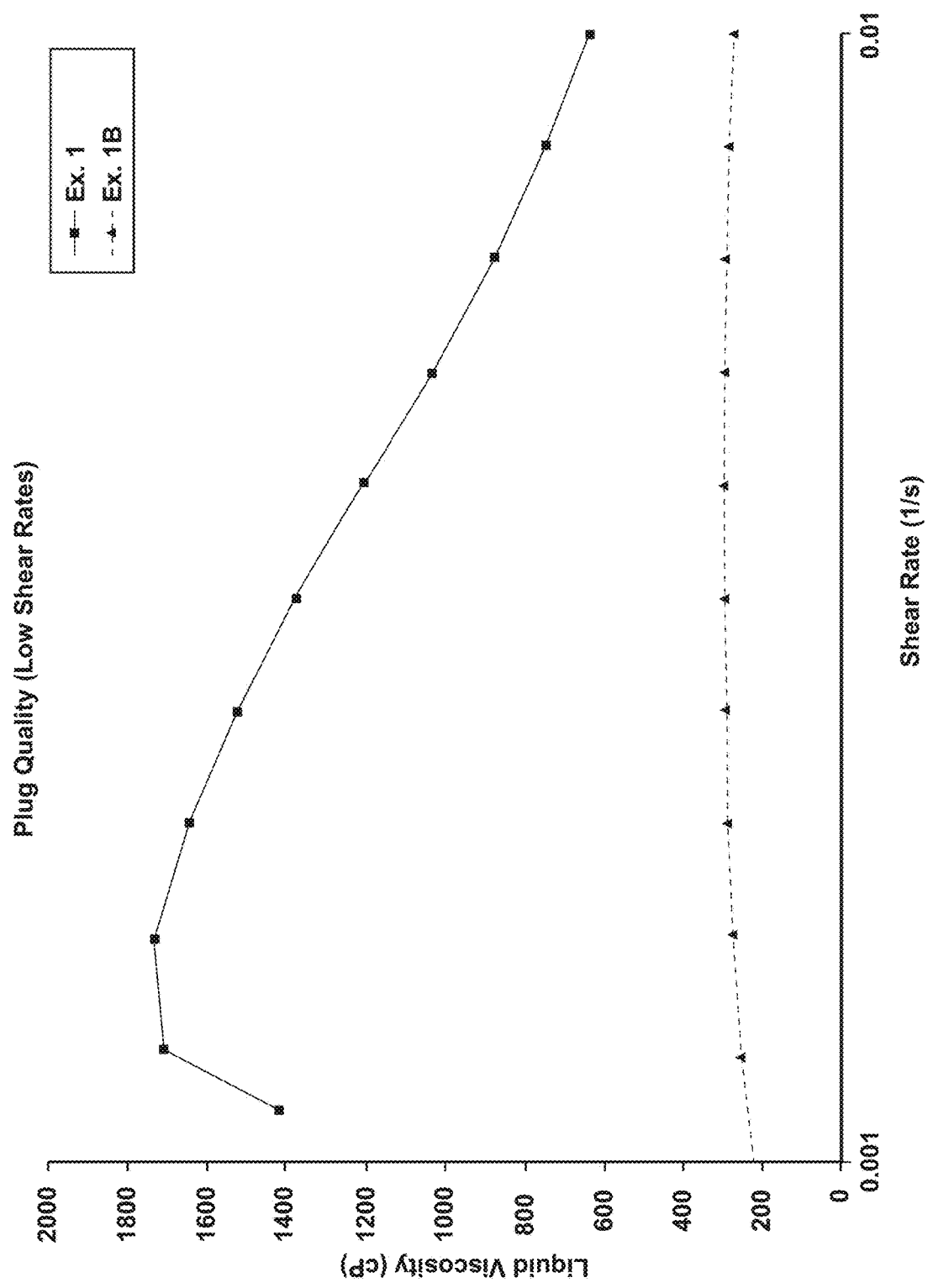
FIG. 4A is a plot of liquid viscosity vs. shear rate range from $0.001\ s^{-1}$ to $100\ s^{-1}$ for cement mixtures for applying to honeycomb bodies, according to embodiments of the disclosure.
Figure 4B:
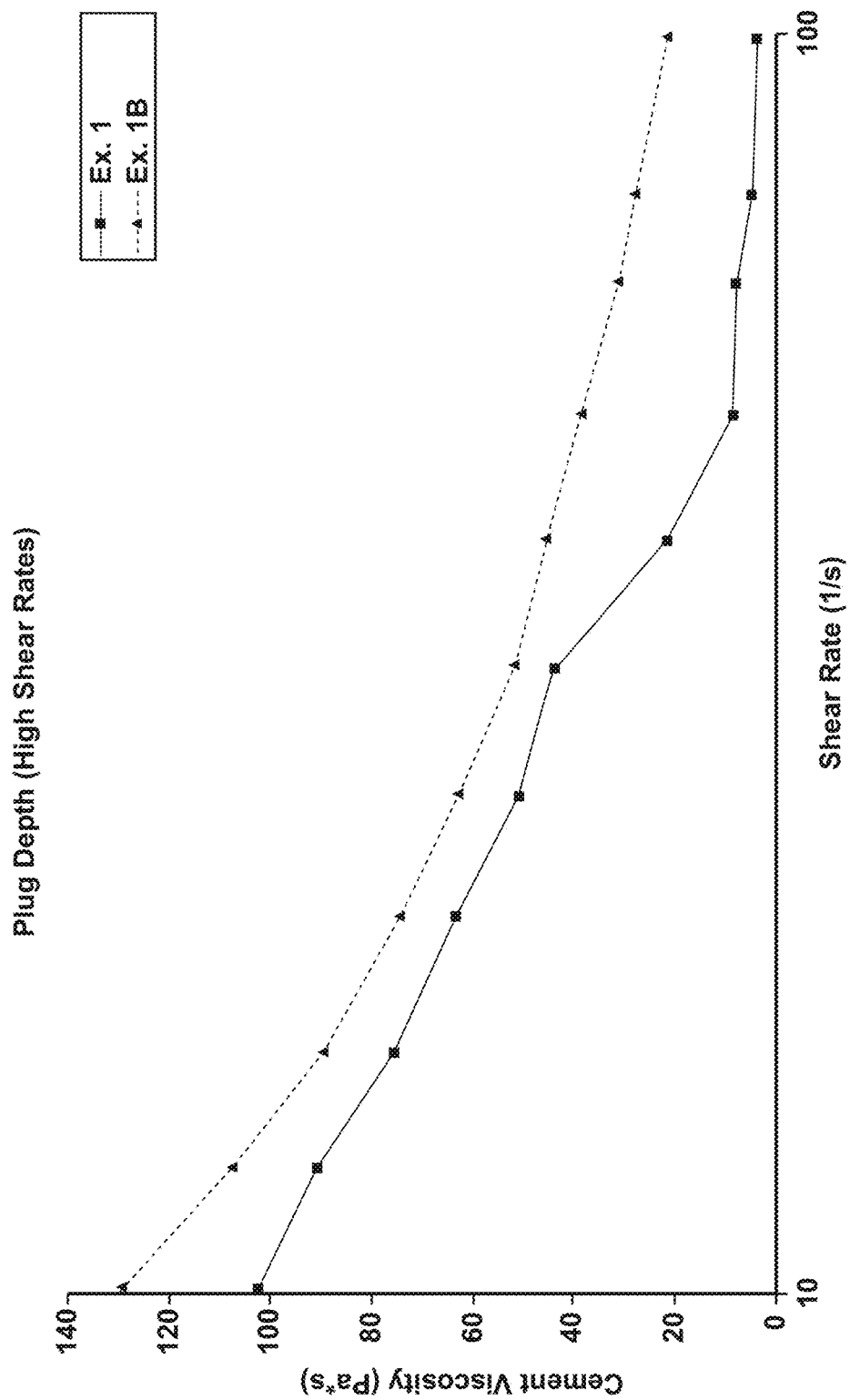
FIG. 4B is an enlarged portion of the plot depicted in FIG. 4A over a shear rate range from $10\ s^{-1}$ to $100\ s^{-1}$ that reports cement viscosity vs. shear rate.

Referring now to FIG. 4A, a plot is provided of liquid viscosity vs. shear rate from 0.001 $s^{-1}$ to 100 $s^{-1}$ for the cement mixtures of this example (Ex. 1 and Ex. 1B), as employed to form plugs in the honeycomb structures of this example. Further, FIG. 4B is an enlarged portion of the plot depicted in FIG. 4A over a shear rate from 10 $s^{-1}$ to 100 $s^{-1}$, reporting cement viscosity (Pa*s) as a function of shear rate. As is evident in FIGS. 4A and 4B, in the low shear rate regime (<0.1/sec), the liquid viscosity levels of the cement mixtures of the disclosure containing PEO (Ex. 1B) are substantially lower than the viscosities of a comparative cement mixture employing methyl cellulose as an organic binder without a hydrophilic polymer or other hydrophilic additive (Ex. 1). Conversely, in the high shear rate regime (10/sec to 100/sec), the cement viscosity levels of the cement mixtures of the disclosure containing PEO (Ex. 1B) are substantially higher than the cement viscosities of a comparative cement mixture (Ex. 1). Without being bound by theory, is believed that these higher viscosities in the high shear rate regime allow for more time for the cement mixture to travel within a given cell, thus maximizing the plug depth that can be achieved. That is, the maximum plug depth can be dependent upon the volume and viscosity of excess fluid in the cement mixture in the high shear rate regime. The more and higher viscosity of the excess fluid in the cement mixture, the longer time that the cement mixture can travel within a cell of the honeycomb structure during the plugging process.

Referring now to FIGS. 5A-5D, optical micrographs are provided of respective cross-sections of porous ceramic wall flow filters with cement mixtures (Ex. 1 and Ex. 1B) disposed in their respective cell channels according to this example. As is evident from FIGS. 5A-5D, the ceramic wall flow filters employing cement mixtures of the disclosure with PEO (Ex. 1B) exhibited a much lower prevalence of voids and other defects in comparison to the wall flow filters employing the comparative cement mixtures (Ex. 1). In addition, it is evident that adjustment in the drying temperature had little effect on the quality of the plugs formed with the cement mixtures of the disclosure (Ex. 1B) (compare FIG. 5A with FIG. 5C). Without being bound by theory, it appears that the cement mixtures of the disclosure employed in this example enable particularly fast reordering and packing during the plugging process, thus resulting in less sensitivity to the drying temperature employed in the process. In contrast, the wall flow filters employing the comparative cement mixtures (Ex. 1) that were oven dried exhibited larger dimples as compared to the samples subjected to air drying (compare FIG. 5B with FIG. 5D).

Example 3

In this example, honeycomb structures with asymmetric cell geometries according to those used in Example 1 were plugged with cement mixtures and methods according to principles of the disclosure. The composition of the cement mixtures employed in this example to form the plugs in these honeycomb structures are detailed above in Table 1 (i.e., Ex. 1B and Ex. 1C). The plugging pressures employed in this example are 20 psi and 10 psi for the larger and smaller cell channels, respectively.

Figures 6A, 6B:
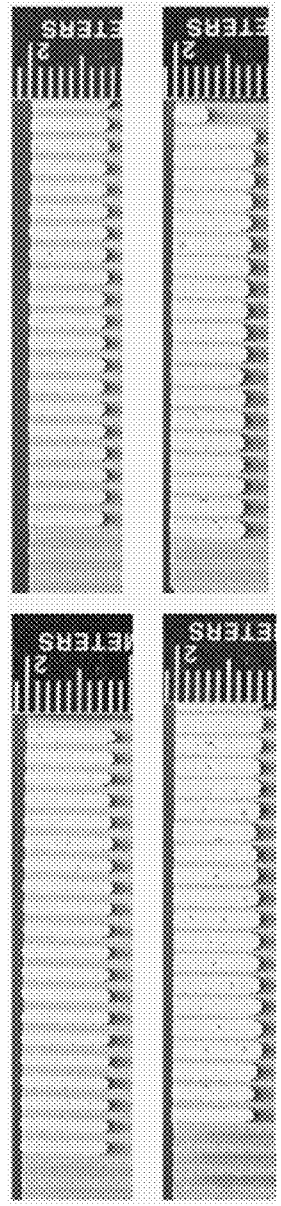
FIGS. 6A and 6B are optical micrographs of respective cross-sections of porous ceramic wall flow filters with cement mixtures disposed in their respective cell channels, according to embodiments of the disclosure.

Referring now to FIGS. 6A and 6B, optical micrographs of respective cross-sections of porous ceramic wall flow filters with the cement mixtures of Table 1 disposed in their respective cell channels are provided. As is evident from the figures, the porous ceramic wall flow filters of this example can be plugged with cement mixtures having an organic binder that comprises PEO (Exs. 1B and 1C) at plug depths below the maximum plug depth (~11-12 mm for the inlet cell channels and >23 mm for the outlet cell channels). In particular, the wall flow filters plugged with Ex. 1B cement mixture exhibit plug depths of 8.22 mm and 8.33 mm for the inlet and outlet cell channels, respectively. Further, the wall flow filters plugged with Ex. 1C cement mixture exhibit plug depths of 7.33 mm and 7.24 mm for the inlet and outlet cell channels, respectively. As noted earlier, the cement mixtures of the disclosure allow for deeper penetration of plugging cement, e.g., maximum plug depth (see Example 1). This example demonstrates that the increased maximum plug depth capability of these cement mixtures can be useful in allowing for adjustments to the composition without a decrease in plug quality. Further, the increased maximum plug depth capability can also be employed for further process control, e.g., as evidenced by the plugging at lower pressures in this example as compared to those employed to achieve the maximum plug depth, $PD_{max}$ (see Example 1).

Example 4

In this example, honeycomb structures with asymmetric cell geometries according to those used in Example 1 were plugged with cement mixtures and methods according to principles of the disclosure at differing plugging pressures to achieve different plug depths. The composition of the cement mixtures employed in this example to form the plugs in these honeycomb structures are detailed above in Table 1 (i.e., Ex. 1B).

Figure 7A:
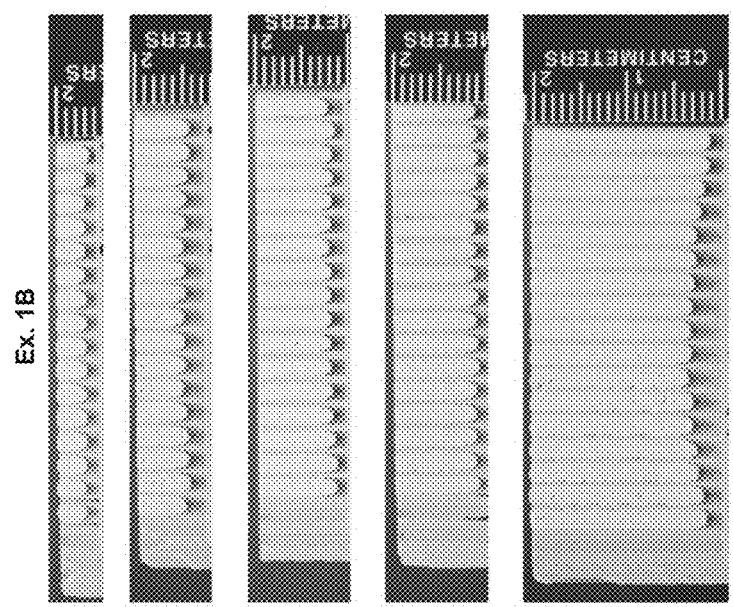
FIG. 7A is a series of optical micrographs of respective cross-sections of porous ceramic wall flow filters with a cement mixture composition disposed in their respective cell channels to varying depths, according to embodiments of the disclosure.
Figure 7B:
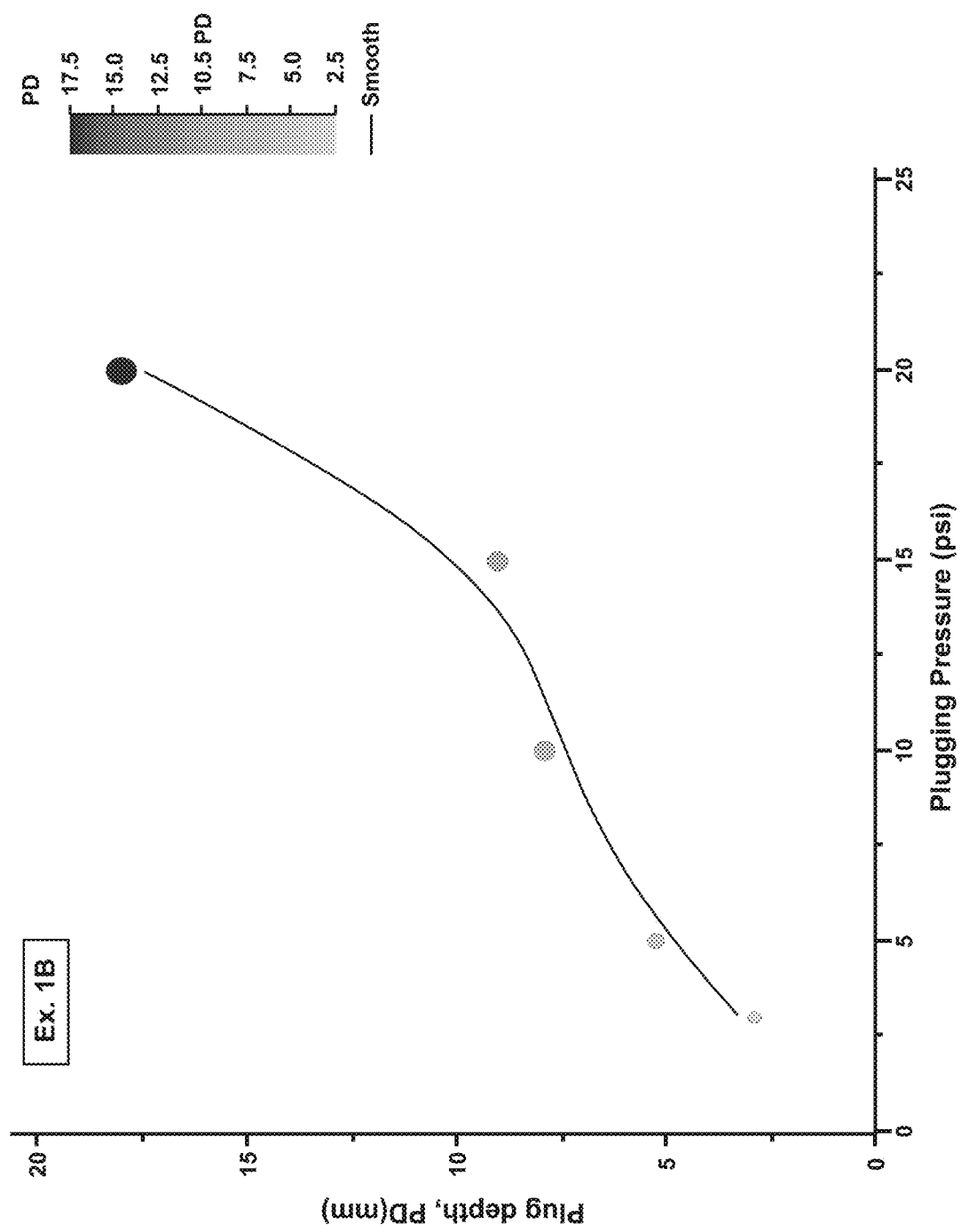
FIG. 7B is a plot of plug depth vs. plugging pressure for the samples depicted in FIG. 7A, according to embodiments of the disclosure.

Referring now to FIG. 7A, a series of optical micrographs is provided of respective cross-sections of porous ceramic wall flow filters with a cement mixture composition (Ex. 1B) disposed in their respective cell channels to varying depths. These varying depths are achieved by varying the plugging pressure. In particular, FIG. 7B is a plot of plug depth vs. plug pressure for the samples depicted in FIG. 7A. As is evident from these figures, the same cement mixture composition (Ex. 1B) was employed to achieve various plug depths with each sample exhibiting plugs with high quality. That is, a cement mixture consistent with the principles of the disclosure was employed in this example to produce wall flow filters having plugs of various depths (from about 3 mm to 20 mm), with high quality plugs at each of these plug depths. In contrast, for wall flow filters produced according to these same conditions with a comparative cement mixture (e.g., Ex. 1), reasonable plug quality can only be achieved with a small window of plug depths (e.g., ~5-6 mm) and a limited maximum plug depth (~10 mm).

Example 5

Figure 8:
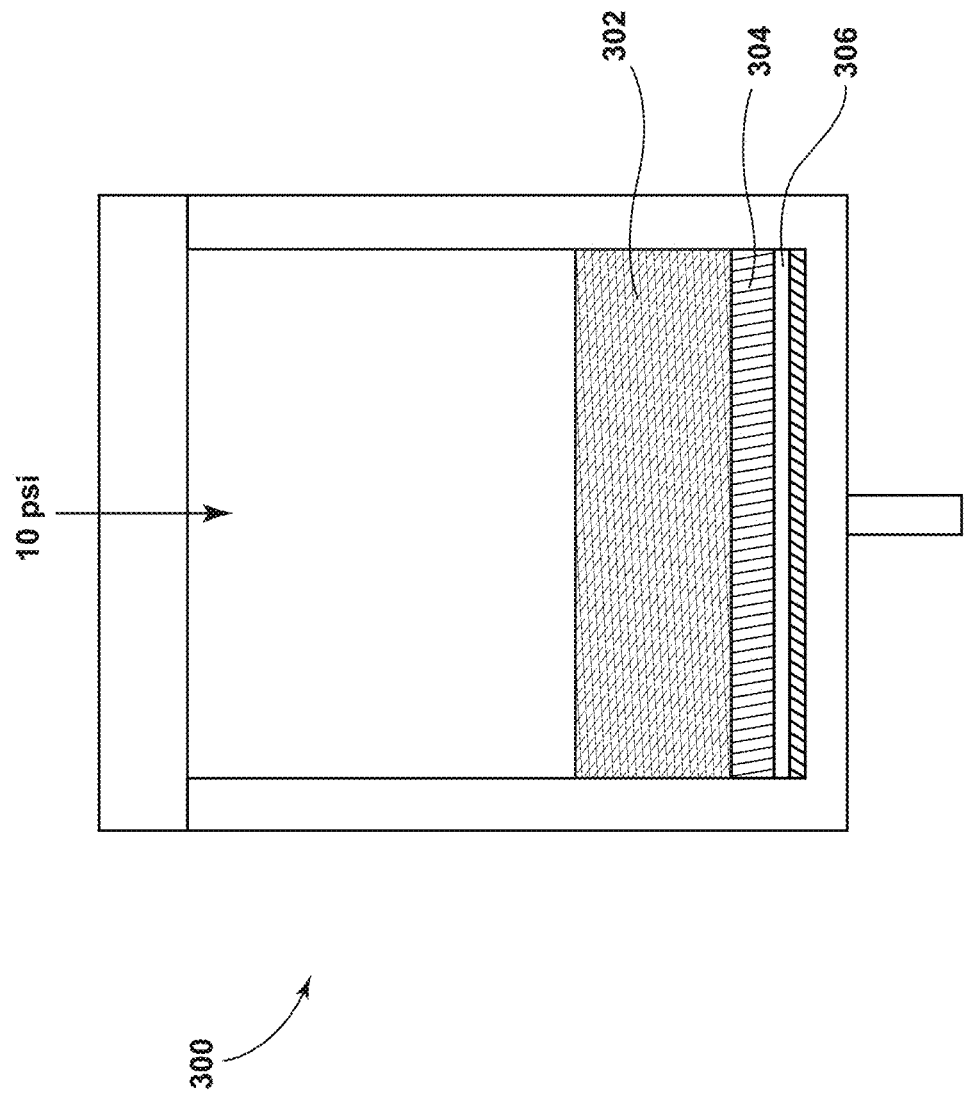
FIG. 8 is a schematic of a filter press used to simulate slip casting of a cement mixture, according to embodiments of the present disclosure.
Figure 9:
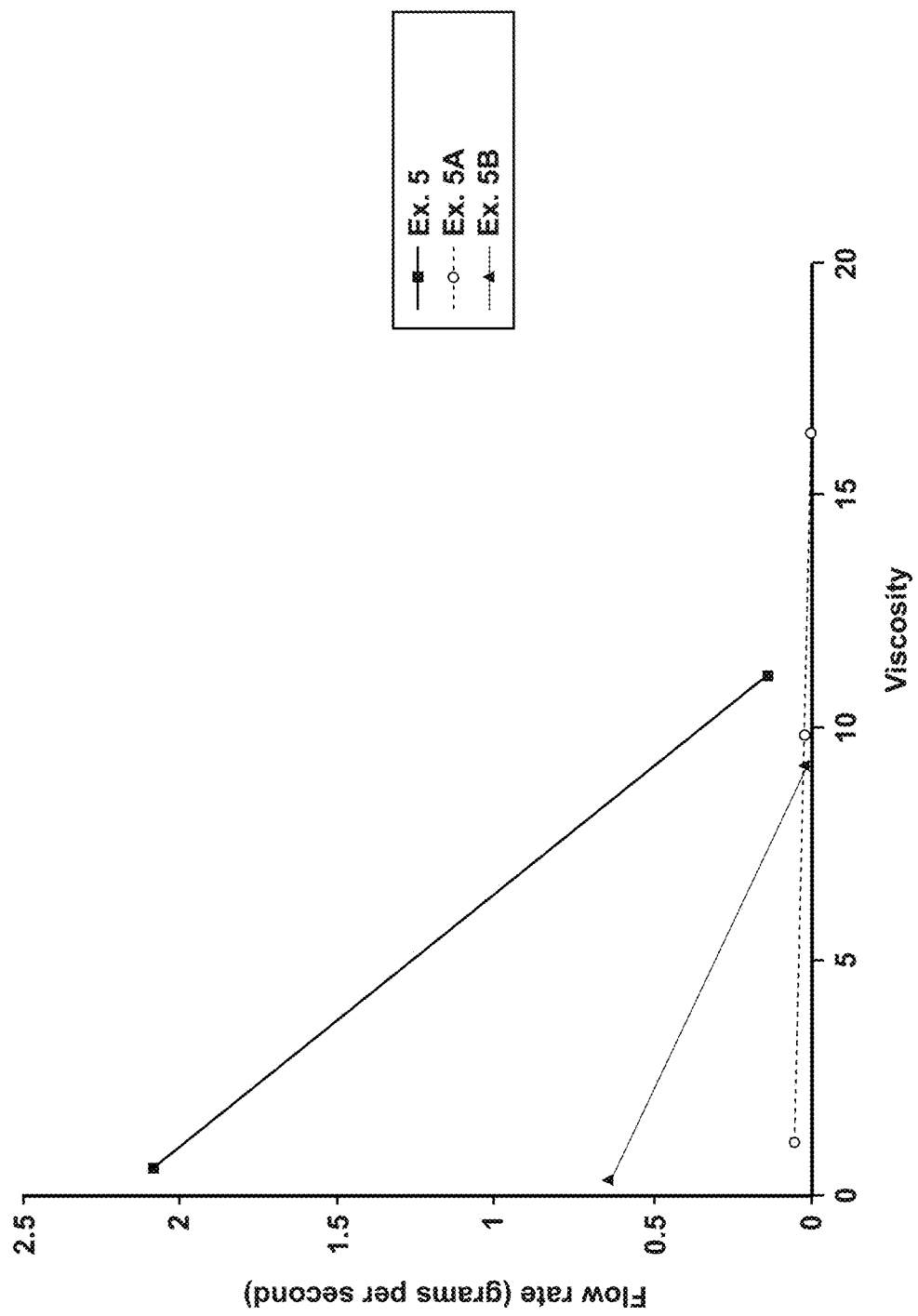
FIG. 9 is a plot of the rate at which a comparative cement mixture and two exemplary cement mixtures according to embodiments of the disclosure pass through the filter press of FIG. 8 as a function of viscosity.

FIG. 8 illustrates a filter press 300 that was used to simulate slip casting of a cement mixture. The filter press 300 was configured to measure the rate of flow of a test solution 302 as it was pushed through a powdered bed of cordierite grog 304 supported on a filter screen 306 toward an outlet 308 at a head pressure of 10 psi. The details of the test solutions 302 are shown in Table 2 below and included: a conventional organic binder, methylcellulose, (Ex. 5); a high molecular weight hydrophilic additive, PEO having a $M_w$ of 2,000,000 g/mol (Ex. 5A); and a high molecular weight hydrophilic additive, PEO having a $M_w$ of 8,000,000 g/mol (Ex. 5B). FIG. 9 is a plot of the rate (in grams per second) at which Ex. 5, Ex. 5A, and 5B passed through the filter press 300 for different viscosities of each of the test solutions. Ex. 5 included a low and high viscosity test solution ("Ex. 5-Low" and "Ex. 5-High"). Ex. 5A included a low, medium, and high viscosity test solution ("Ex. 5A-Low," "Ex. 5A-Med," and "Ex. 5A-High"). Ex. 5B included a low and high viscosity test solution ("Ex. 5B-Low" and "Ex. 5B-High"). The viscosity of each test solution was measured using a viscometer at shear rates from 0.1 Hz to 10 Hz and reported as the area under the curve in Pas.

TABLE 2

| | | Composition | | | | |
| --- | --- | --- | --- | --- | --- | --- |
| Sample | Water (g) | Colloidal Silica (g) | Methyl-cellulose (g) | PEO $M_w$ of 8,000,000 g/mol (g) | PEO $M_w$ of 2,000,000 g/mol (g) | Property Viscosity (Pa · s) |
| Ex. 5 - Low | 100 | 105 | 0.84 | N/A | N/A | 0.52 |
| Ex. 5- High | 100 | 105 | 0.68 | N/A | N/A | 11.11 |
| Ex. 5A- Low | 100 | N/A | N/A | 0.55 | N/A | 1.087 |
| Ex. 5A- Med | 100 | N/A | N/A | 1.1 | N/A | 9.834 |
| Ex. 5A- High | 100 | 105 | N/A | 0.84 | N/A | 16.313 |
| Ex. 5B- Low | 100 | N/A | N/A | N/A | 0.55 | 0.295 |
| Ex. 5B- High | 100 | 105 | N/A | N/A | 0.84 | 9.15 |

As shown in FIG. 9 for Ex. 5, at low viscosity, the methylcellulose solution flows through the grog 304 at a rate of over 2 grams per second (g/s) and reduces significantly as the viscosity of the methylcellulose solution is increased. The data for Ex. 5A (PEO, $M_w$ 2,000,000 g/mol) shows that at low viscosity, the rate of flow through the grog 304 is less than that of the low viscosity methylcellulose solution of Ex. 5. The data for Ex. 5B (PEO, $M_w$ of 8,000,000 g/mol) shows that as the molecular weight of the hydrophilic additive increases, the viscosity dependence of the flow rate is minimal. Without wishing to be limited by any theory, it is believed that the decrease in viscosity dependence of the flow rate is indicative of the different mechanisms that reduce slip casting for methylcellulose and high molecular weight additives, such as PEO. It is believed that for smaller molecular weight organic polymers, such as methylcellulose ($M_w$~70,000 g/mol), it is the increase in viscosity of the solution that is responsible for slowing the flow of liquid through the grog. In contrast, for the high molecular weight additives having a weight average molecular weight $M_w$ of at least 1,000,000 g/mol (such as PEO, $M_w$ 2,000,000 g/mol and PEO, $M_w$ of 8,000,000 g/mol), it is believed that entanglement of the polymer is at least partially responsible for slowing the flow of liquid through the grog. Even at low viscosities, the entanglement of the large molecular weight polymers is high, and thus the liquid flow through the grog is lower than a smaller molecular weight polymer at a similar viscosity.

Example 6

Figure 10:
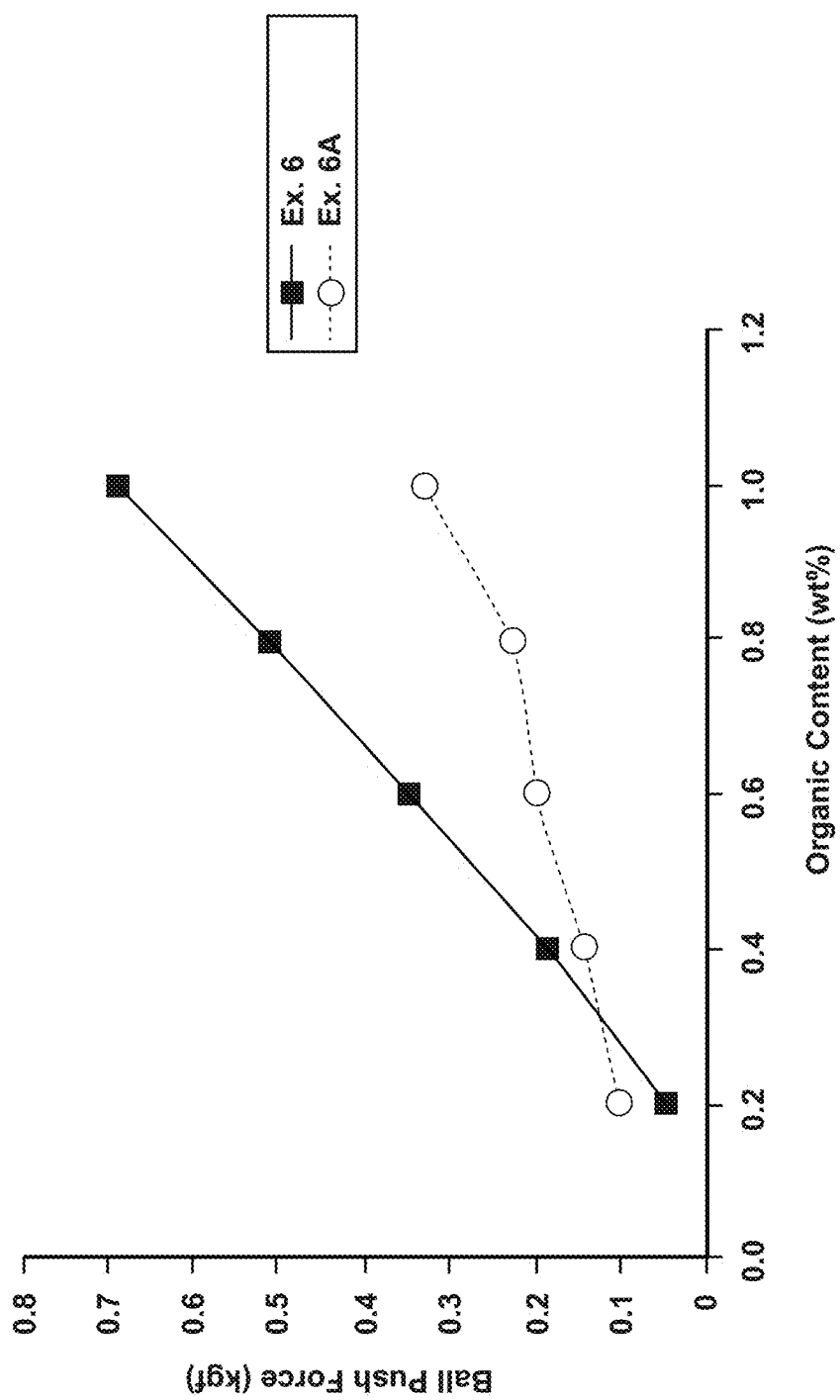
FIG. 10 is a plot of ball push force as a function of organic content for a comparative cement mixture containing a conventional organic binder and an exemplary cement mixture containing a high molecular weight additive, according to embodiments of the disclosure.

FIG. 10 is a plot of cement viscosity as a function of the percent of organic content of the mixture for a mixture containing a conventional organic binder, methylcellulose (Ex. 6), and a high molecular weight hydrophilic additive according to the present disclosure, PEO having a $M_w$ of 8,000,000 g/mol (Ex. 6A), at an organic content of 0.20 wt %, 0.40 wt %, 0.60 wt %, 0.80 wt %, and 1.00 wt %. The cement viscosity was measured using a ball push test set-up that used a force gauge configured to push a 1 inch ball into the cement at a rate of 6 inches per minute. A higher ball push force (measured in kilogram-force, "kgf") is indicative of a higher cement viscosity. Table 3 lists the components and their amounts for Ex. 6A and Table 4 lists the components and their amounts for Ex. 6. Clayrac™ SF is an example of a suitable source of inorganic particles and is available from Imerys Ceramics. Ludox® PW-50EC is an example of an inorganic binder including colloidal silica particles and is available from W.R. Grace & Co. Methocel™ A4M is an example of a methylcellulose organic binder and is available from DuPont.

TABLE 3

| Type | Material | Ex. 6A | | | | |
|---|---|---|---|---|---|---|
| | | Composition (wt %) | | | | |
| Inorganic Particles | Clayrac ™ SF | 100.0 wt % | 100.0 wt % | 100.0 wt % | 100.0 wt % | 100.0 wt % |
| Vehicle | Water | 23.8 wt % | 23.8 wt % | 23.8 wt % | 23.8 wt % | 23.8 wt % |
| Colloidal Silica | Ludox PW-50EC | 25 wt % | 25 wt % | 25 wt % | 25 wt % | 25 wt % |
| Organic Binder | PEO $M_w$ of 8,000,000 g/mol | 0.20 wt % | 0.40 wt % | 0.60 wt % | 0.80 wt % | 1.00 wt % |
| | | Composition (grams) | | | | |
| Inorganic Particles | Clayrac ™ SF | 536.91 g | 536.19 g | 535.48 g | 534.76 g | 534.05 g |
| Vehicle | Water | 127.79 g | 127.61 g | 127.44 g | 127.27 g | 127.10 g |
| Colloidal Silica | Ludox PW-50EC | 134.23 g | 134.05 g | 133.87 g | 133.69 g | 133.51 g |
| Organic Binder | PEO $M_w$ of 8,000,000 g/mol | 1.07 g | 2.14 g | 3.21 g | 4.28 g | 5.34 g |

TABLE 4

| Type | Material | Ex. 6 | | | | |
|---|---|---|---|---|---|---|
| | | Composition (wt %) | | | | |
| Inorganic Particles | Clayrac ™ SF | 100.0 wt % | 100.0 wt % | 100.0 wt % | 100.0 wt % | 100.0 wt % |
| Vehicle | Water | 23.8 wt % | 23.8 wt % | 23.8 wt % | 23.8 wt % | 23.8 wt % |
| Colloidal Silica | Ludox PW-50EC | 25 wt % | 25 wt % | 25 wt % | 25 wt % | 25 wt % |
| Organic Binder | Methocel ™ A4M | 0.20 wt % | 0.40 wt % | 0.60 wt % | 0.80 wt % | 1.00 wt % |
| | | Composition (grams) | | | | |
| Inorganic Particles | Clayrac ™ SF | 536.91 g | 536.19 g | 535.48 g | 534.76 g | 534.05 g |
| Vehicle | Water | 127.79 g | 127.61 g | 127.44 g | 127.27 g | 127.10 g |
| Colloidal Silica | Ludox PW-50EC | 134.23 g | 134.05 g | 133.87 g | 133.69 g | 133.51 g |
| Organic Binder | Methocel ™ A4M | 1.07 g | 2.14 g | 3.21 g | 4.28 g | 5.34 g |

A conventional plugging cement mixture typically uses organic binders, such as methylcellulose, to increase the liquid viscosity in the cement mixture, which can facilitate reducing the slip casting rate and enable increased plug depth capability. However, increasing the liquid viscosity may also increase the cement viscosity. As shown in FIG. 10 for the methylcellulose containing example, Ex. 6, as the content of methylcellulose in the mixture increases, the cement viscosity (as measured by ball push force) also increases. When the ball push force becomes too high, processing issues such as pumping and refill times for plugging wall flow filters can increase. A high ball push force can also lead to potential plugging defects, such as random long plugs and corner filling issues, which can be detected as light leaks. A high ball push may also counteract the increased plug depth capability that is typically the intended reason for increasing the organic content. In conventional plugging mixtures, water can be added to attempt to counteract the increase in ball push force as a result of the increased organic content, however, the increased water content reduces the solid load. The reduced solid load can lead to an increase in shrinkage of the cement mixture during drying, which may result in an undesirable level of voids and dimples in the plugs (i.e., poor plug quality).

As shown in FIG. 10 for Ex. 6A, as the amount of high molecular weight PEO of 8,000,000 g/mol increases, the ball push force also increases, albeit at a much lower rate compared to the conventional methylcellulose organic binder of Ex. 6. The data in shown in FIG. 10 suggests that high molecular weight organics, such as high molecular weight PEO, can be added to a cement plugging mixture to increase the liquid viscosity of a cement mixture while producing a correspondingly lower increase in the cement viscosity of the mixture compared to conventional organic binders, such as methylcellulose. The lower cement viscosity (i.e., the lower ball push force) exhibited by the increasing amounts of PEO indicates that, compared to methylcellulose, as the concentration of PEO increases, less water needs to be added to the mixture, which can facilitate a higher plug quality (i.e., fewer dimples and voids in the dried plug).

Example 7

Figure 11:
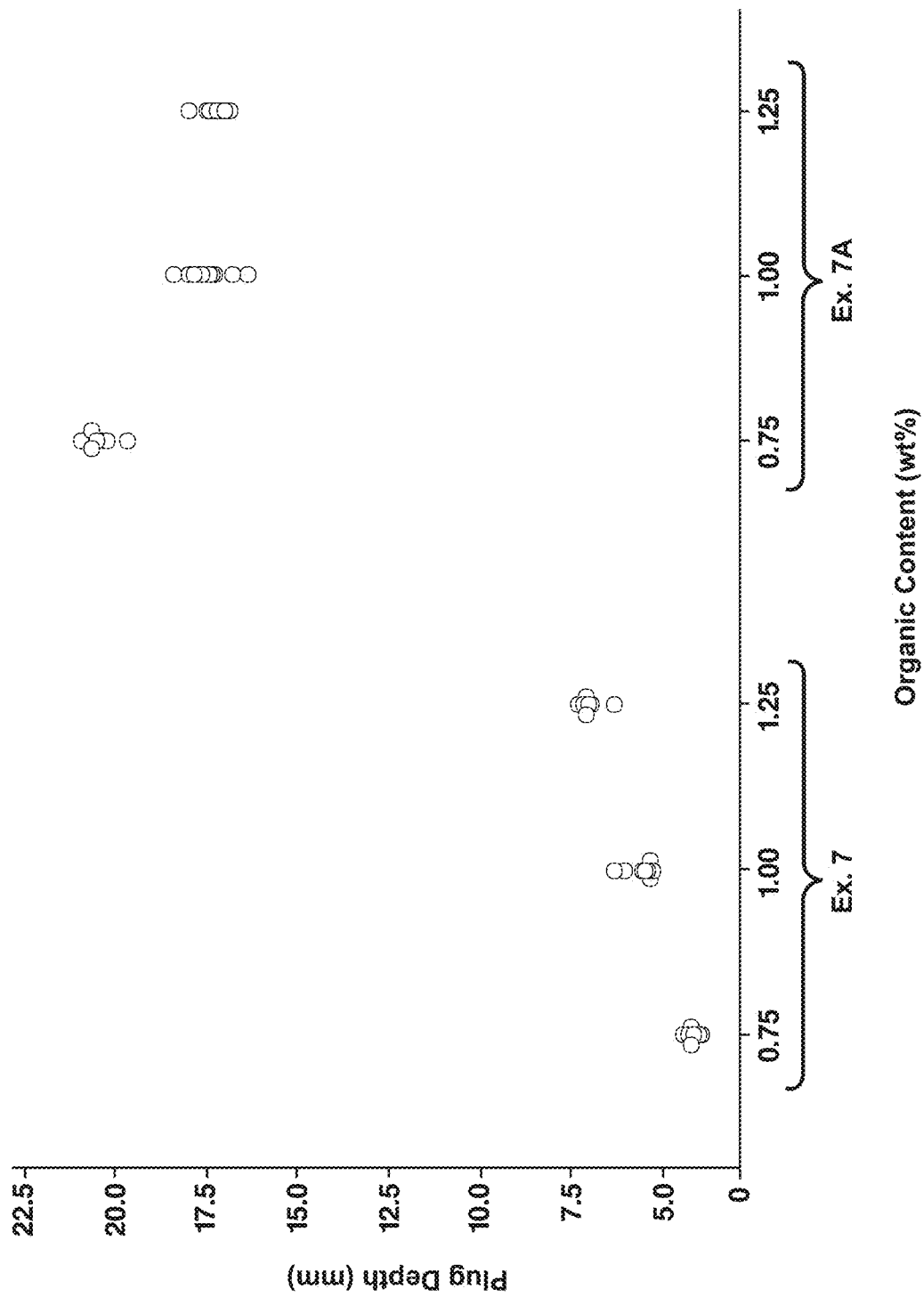
FIG. 11 is a plot of plug depth as a function of organic content for several comparative cement mixtures containing a conventional organic binder and several exemplary cement mixtures containing a high molecular weight additive, according to embodiments of the disclosure.
Figure 12:
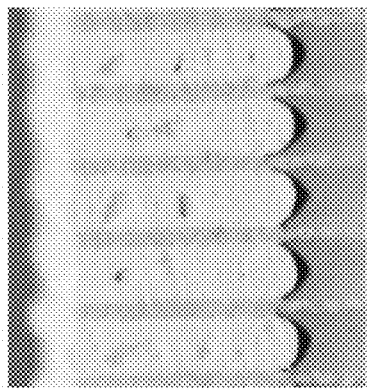
FIG. 12 is a series of optical micrographs of cross-sections of porous ceramic wall flow filters with the comparative cement mixtures and exemplary cement mixtures of FIG. 11 disposed in their respective channels, according to embodiments of the disclosure.
Figure 12:
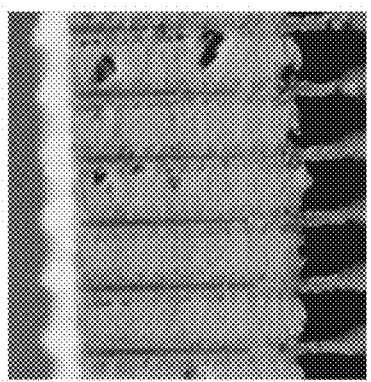
Figure 12:
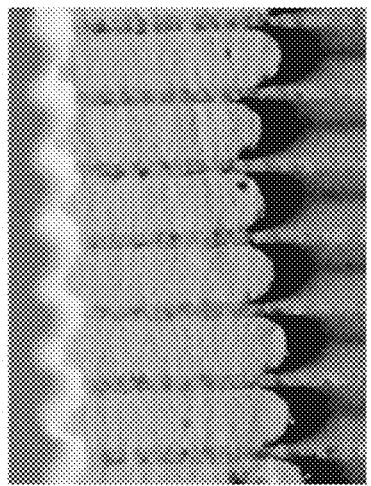
Figure 12:
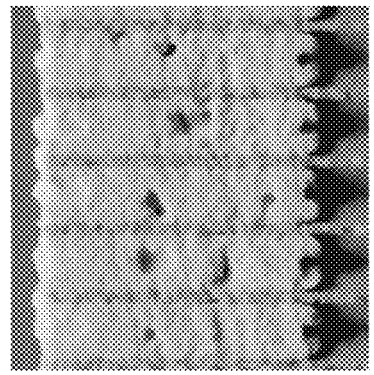
Figure 12:
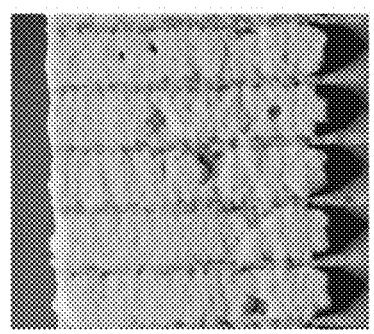
Figure 12:
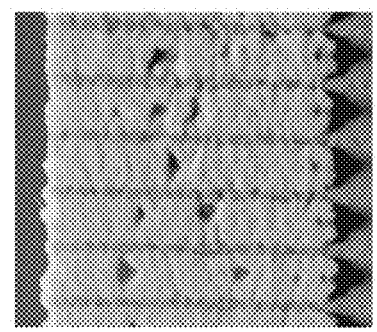

FIGS. 11 and 12 compare the plug depth capabilities of a cement mixture containing a conventional organic binder, methylcellulose, and a high molecular weight hydrophilic additive according to the present disclosure (PEO, $M_w$ of 8,000,000 g/mol). FIGS. 11 and 12 illustrate a maximum achievable plug depth and representative plug images, respectively, for a conventional cement mixture including methylcellulose as an organic binder (Ex. 7) and an exemplary cement including a high molecular weight additive, PEO having a $M_w$ of 8,000,000 g/mol (Ex. 7A). Mixtures having an organic content of 0.75 wt %, 1.00 wt %, and 1.25 wt % were investigated for both Ex. 7 and Ex. 7A. The plug depth capability was tested on a 300/9 AC/ACT asymmetric honeycomb structure with an inlet pressure of 70 psi during plugging. Tests were conducted on 2 inch diameter parts that were fixed into a holder where a cement mixture can be applied to the part. A piston outfitted with a pressure transducer was fixed to an Instron machine that was capable of controlling the velocity of the piston and measuring the pressure. The system pushed the cement mixture into the part until the desired pressure was reached. As shown in the plot in FIG. 11, the maximum achievable depth for the cement mixture including high molecular weight PEO (Ex. 7A) was about 3-4 times that achievable by a cement mixture containing methylcellulose (Ex. 7). The plug depth data shown in FIG. 11 suggests that replacement of a conventional organic binder with a high molecular weight hydrophilic additive can facilitate achieving a greater plug depth than is achievable by the conventional organic binder alone.

The images in FIG. 12 suggest that a conventional organic binder, such as methylcellulose, may still be an important component in achieving a plug of good quality. As shown in the exemplary images of FIG. 12, while the PEO containing example, Ex. 7A, is able to produce plugs having a greater depth than the methylcellulose containing example, Ex. 7, the plugs of Ex. 7A are of a lower quality, as indicated by the appearance of voids and dimples in the plugs. It is believed that the increasing amounts of PEO in Ex. 7A may increase the slip casting of the mixture to such an extent that the cement mixture does not fully adhere to the substrate wall during drying, thus resulting in the increase in dimples and voids in the plugs due to the lack of consolidation. The data in FIGS. 11 and 12 suggest that a combination of a conventional organic binder, such as methylcellulose, with a high molecular weight hydrophilic additive can provide a balance between a desired maximum achievable plug depth and plug quality.

Example 8

Figure 13:
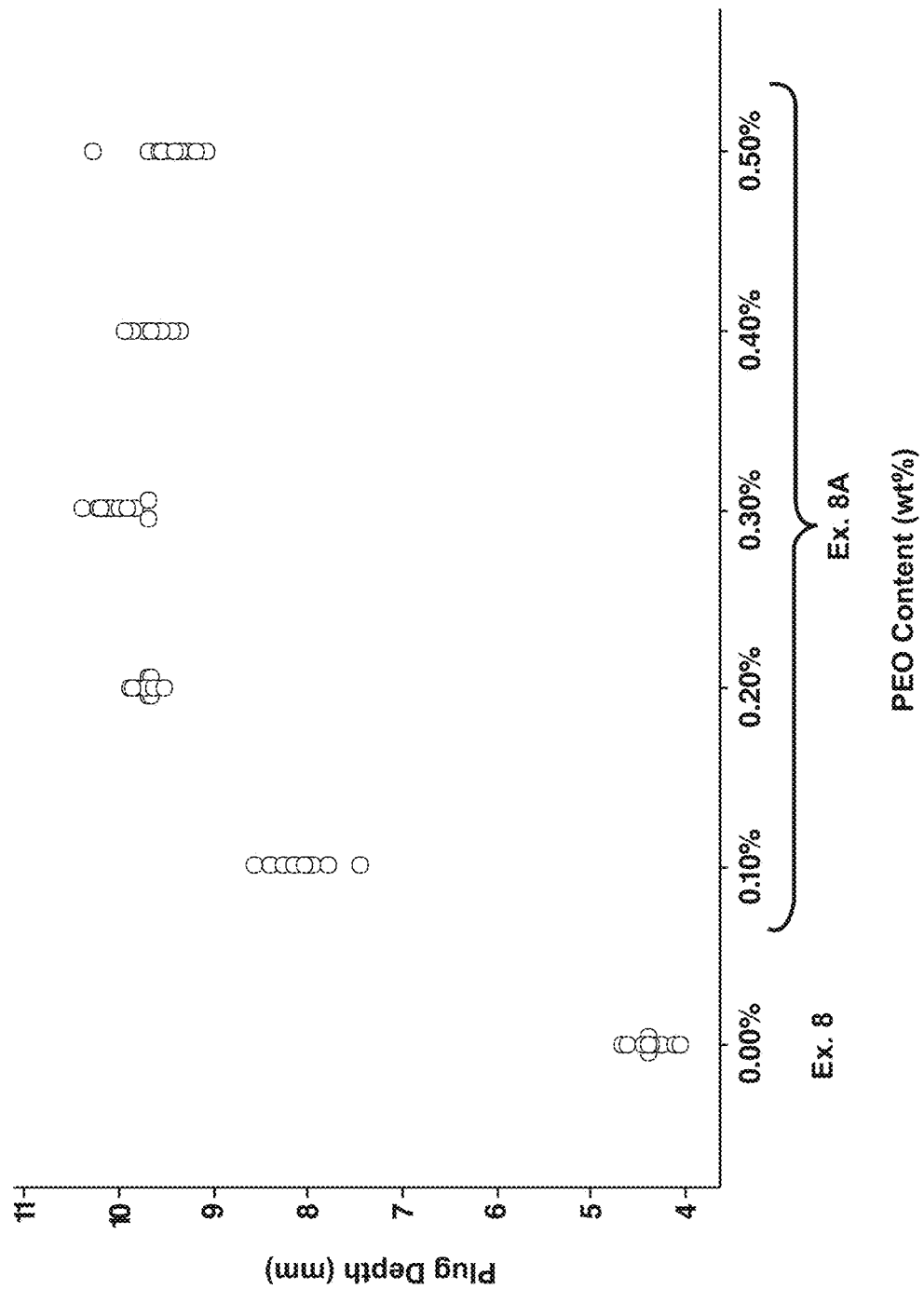
FIG. 13 is a plot of plug depth for a comparative cement mixture and several exemplary cement mixtures containing a high molecular weight additive at different amounts, according to embodiments of the disclosure.

FIG. 13 is a plot illustrating the plug depth achievable for a cement mixture containing methylcellulose and varying amounts of a high molecular weight hydrophilic additive (PEO, $M_w$ of 8,000,000 g/mol) according to the present disclosure. The plug depth capability was tested on a 300/9 AC/ACT asymmetric honeycomb structure with an inlet pressure of 70 psi during plugging. The plugging set-up was the same as described above in Example 7. Ex. 8, which contained 1 wt % methylcellulose, was run for comparison. Ex. 8A contained a cement mixture that was similar to Ex. 8, except for the addition of 0.10 wt %, 0.20 wt %, 0.30 wt %, 0.40 wt %, or 0.50 wt % of PEO having a $M_w$ of 8,000,000 g/mol. The data in FIG. 13 shows that the plug depth increases with the addition of 0.10 wt % PEO and nearly doubles with the addition of 0.20 wt % PEO compared to Ex. 8, which included only methylcellulose. The data in FIG. 13 suggests that an organic binder containing a combination of methylcellulose and a high molecular weight additive, such as high molecular weight PEO, can achieve a greater plug depth at a particular inlet pressure compared to the use of methylcellulose alone.

Example 9

Figure 14:
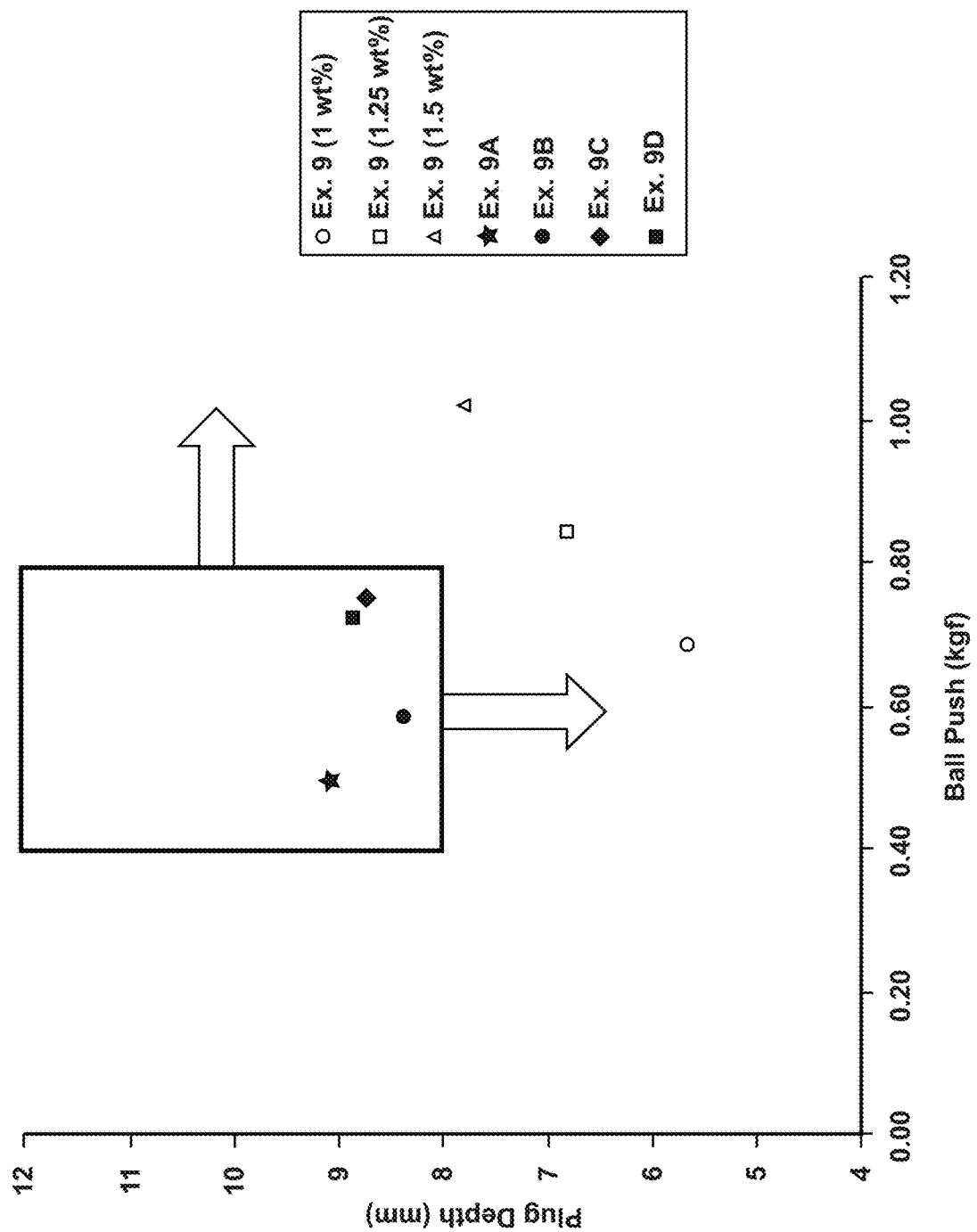
FIG. 14 is a plot of plug depth and ball push force for several comparative cement mixtures containing a conventional organic binder and several exemplary cement mixtures containing a high molecular weight additive, according to embodiments of the disclosure.

FIG. 14 is a plot illustrating the plug depth obtainable for cement mixtures at a high solid load content of 46 wt % and the ball push force of each mixture. The plug depth capability was tested on a 300/9 AC/ACT asymmetric honeycomb structure with an inlet pressure of 70 psi during plugging. The ball push force was measured as described above in Example 6. Ex. 9 included cement mixtures containing 1 wt %, 1.25 wt %, and 1.5 wt % of methylcellulose as an organic binder. Ex. 9A-D were cement mixtures containing an organic binder that included a combination of methylcellulose and a high molecular weight PEO additive as follows: 0.6 wt % methylcellulose and 0.2 wt % PEO, $M_w$ of 8,000,000 g/mol (Ex. 9A); 0.8 wt % methylcellulose and 0.2 wt % PEO, $M_w$ of 8,000,000 g/mol (Ex. 9B); 1 wt % methylcellulose and 0.2 wt % PEO, $M_w$ of 8,000,000 g/mol (Ex. 9C); and 1 wt % methylcellulose and 0.2 wt % PEO, $M_w$ of 2,000,000 g/mol (Ex. 9D).

The box outline in FIG. 14 indicates a desired combination of plug depth and ball push force values for a cement mixture having a 46 wt % solid content. Cement mixtures having ball push values to the right of the box (right leading arrow) are typically too stiff to pump using conventional plugging processing equipment. As can be seen by the data in FIG. 14, Ex. 9, which contained only methylcellulose as the organic binder, was not capable of achieving the desired 8 mm plug depth. Ex. 9 also form cement mixtures having a high ball push force value, suggesting that these cement mixtures would be challenging to pump using conventional processing equipment. Conventional wisdom suggests that in order for Ex. 9 to reach the desired plug depth and stay below the desired ball push force values, the solid content of the mixture would have to be decreased. In contrast, cement mixtures Ex. 9A-D are all capable of providing a plugging cement mixture that is capable of satisfying both the plug depth and ball push force requirements at the desired high solid load content.

In some applications, production capabilities may not allow for the use of high plugging pressures (e.g., greater than 50 psi). The present data suggests that a high molecular weight additive, such as PEO, can facilitate increasing plug quality at lower plugging pressures due to the ability to facilitate forming high solid load mixtures exhibiting lower ball push forces. Low plugging pressures, such as 20 psi or less, may require a low cement viscosity in order to obtain the desired plug depth. The high molecular weight additives of the present disclosure can allow for a higher solid load content at lower cement viscosities compared to a conventional organic binder that does not include the present high molecular weight additives.

Example 10

Figure 15:
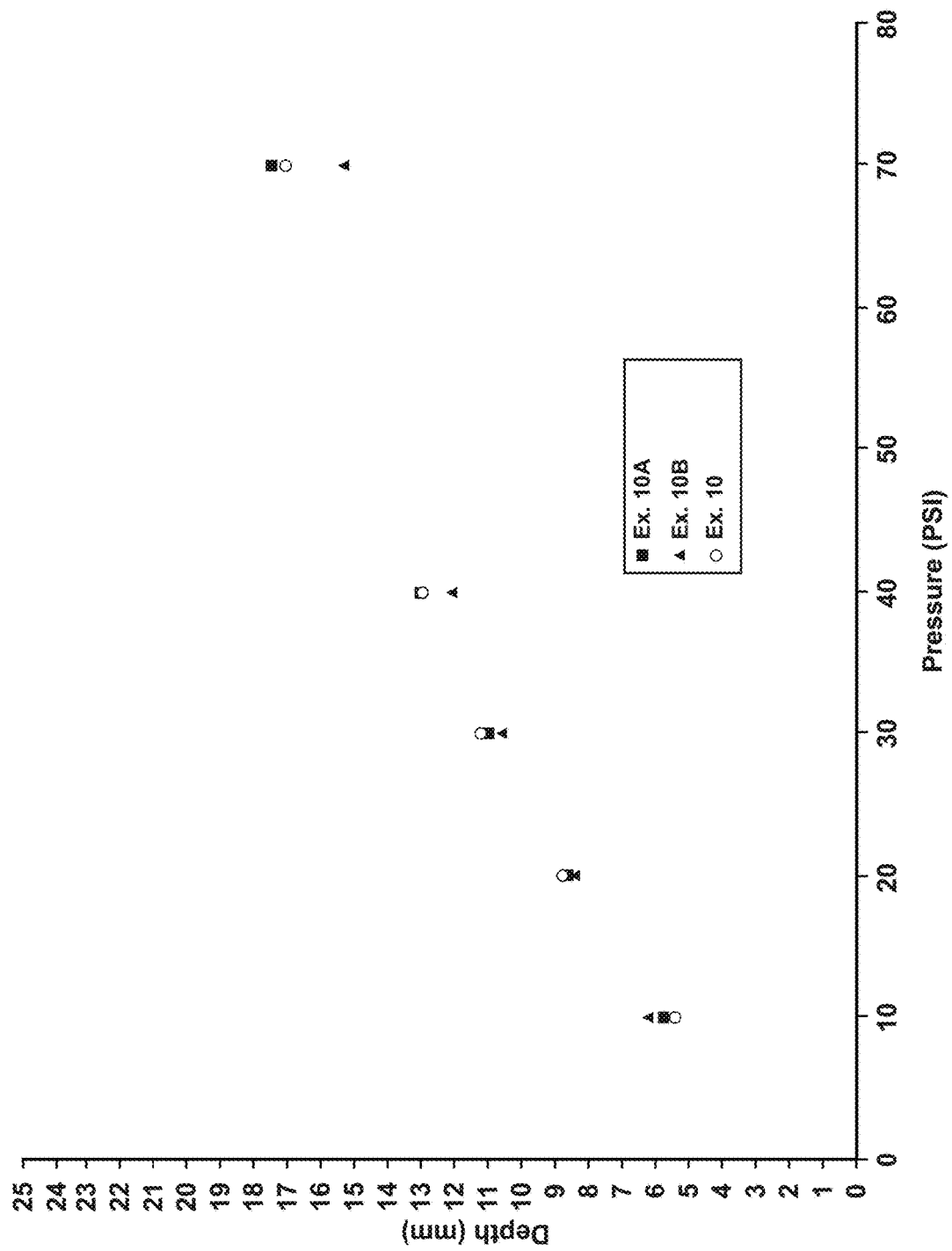
FIG. 15 is a plot of plug depth as a function of plugging pressure for a comparative cement mixture and several exemplary cement mixtures containing a high molecular weight additive at different amounts, according to embodiments of the disclosure.

FIG. 15 is a plot of plug depth as a function of pressure for a cement mixture containing methylcellulose as the organic binder (Ex. 10) and two cement mixtures containing a combination of methylcellulose and PEO ($M_w$ of 8,000,000 g/mol) (Ex. 10A-B). The cement mixtures were designed to target a plug depth of about 8 mm to 9 mm on a 300/9 Inlet AC/ACT honeycomb structure having an asymmetric cell geometry at a plugging pressure of 20 psi. The plugging set-up was the same as described above in Example 7. The data in FIG. 15 and the images in FIGS. 16A-C compare the ability of Ex. 10 and Ex. 10A-B to form plugs having a desired target depth in the smaller cell channels on the inlet end of an asymmetric honeycomb structure at a low pressure while also forming high quality plugs in the larger cell channels on the outlet end of the honeycomb structure.

Each of the comparative and exemplary cement mixtures were made using the same grog material in order to compare the plug quality in the larger cell channels on the outlet end of the structure. Ex. 10 included an organic binder containing 1.5 wt % methylcellulose, 27 wt % water, and a solid load content of 43 wt %, and exhibited a ball push force of 0.523 kgf. Ex. 10A included an organic binder containing 1 wt % methylcellulose and 0.25 wt % PEO ($M_w$ of 8,000,000 g/mol), 28 wt % water, and a solid load content of 44.5 wt %, and exhibited a ball push force of 0.464 kgf. Ex. 10B include an organic binder containing 0.75 wt % methylcellulose and 0.25 wt % PEO ($M_w$ of 8,000,000 g/mol), 25 wt % water, and a solid load content of 46.3 wt %, and exhibited a ball push force of 0.459 kgf.

FIGS. 16A-C show exemplary images for plugs made using Ex. 10 and plugs made using Ex. 10A-B, respectively. FIGS. 16B-C show that the plugs made using Ex. 10A-B containing a high molecular weight additive (PEO) had a higher plug quality on the outlet end of the structure compared to the plugs made using Ex. 10 (FIG. 16A), as indicated by the formation of less voids and dimples in the dried plug. Without wishing to be limited by any theory, it is believed that the higher solid load content of Ex. 10A-B attainable through the use of the high molecular weight additive in the organic binder component of the cement mixture facilitates the forming of higher quality plugs in the larger cell channels on the outlet end of the honey comb structure.

The following non-limiting aspects are encompassed by the present disclosure. To the extent not already described, any one of the features of the following aspects may be combined in part or in whole with features of any one or more of the other aspects of the present disclosure to form additional aspects, even if such a combination is not explicitly described.

According to a first aspect, a cement mixture for applying to a honeycomb body is provided comprising: (i) inorganic ceramic particles; (ii) an inorganic binder; (iii) an organic binder comprising one or more of a hydrophilic polymer and a hydrophilic additive; and (iv) an aqueous liquid vehicle, wherein the cement mixture exhibits a cement viscosity of less than 7000 Pa·s at a shear rate of less than 0.1/sec and greater than 25 Pa·s at a shear rate from 20/sec to 100/sec.

According to a second aspect, the first aspect is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 50 centipoise to 1500 centipoise at a shear rate from 0.001/sec to 0.007/sec.

According to a third aspect, the first aspect is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 100 centipoise to 1000 centipoise at a shear rate from 0.001/sec to 0.007/sec.

According to a fourth aspect, the first aspect is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 100 centipoise to 600 centipoise at a shear rate from 0.001/sec to 0.007/sec.

According to a fifth aspect, any one of the first through fourth aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly (2-oxazoline), dextran, dextrin, a gum, pectin, polysaccharides, modified cellulose, polyacrylic acid and polystyrene sulfonate.

According to a sixth aspect, any one of the first through fifth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a seventh aspect, a cement mixture for applying to a honeycomb body is provided comprising: (i) inorganic ceramic particles from 55% to 70% by weight; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to an eighth aspect, the seventh aspect is provided, wherein the inorganic binder comprises aqueous colloidal silica and the inorganic ceramic particles comprises cordierite.

According to a ninth aspect, the seventh aspect is provided, wherein the cement mixture comprises a solids component and a liquids component, the solids component comprising the inorganic ceramic particles and the liquids component comprising the inorganic binder, the organic binder and the aqueous liquid vehicle, wherein a ratio of the solids component to the liquids component is from 0.82:1 to 4:1.

According to a tenth aspect, any one of the seventh through ninth aspects is provided, further comprising: a solids component and a liquids component, the solids component comprising the inorganic ceramic particles and the liquids component comprising the inorganic binder, the organic binder and the aqueous liquid vehicle, wherein the liquids component further exhibits a liquid viscosity from 50 centipoise to 1500 centipoise at a shear rate from 0.001/sec to 0.007/sec.

According to an eleventh aspect, any one of the seventh through tenth aspects is provided, wherein the cement mixture further exhibits a cement viscosity of less than 7000 Pas at a shear rate of less than 0.1/sec and greater than 25 Pa·s at a shear rate from 20/sec to 100/sec.

According to a twelfth aspect, any one of the seventh through eleventh aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate.

According to a thirteenth aspect, any one of the seventh through twelfth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a fourteenth aspect, any one of the seventh through thirteenth aspects is provided, wherein the organic binder comprises one of: (a) hydroxyethyl cellulose (HEC), (b) polyethylene oxide (PEO), (c) HEC and PEO, and (d) methyl cellulose and PEO.

According to a fifteenth aspect, any one of the seventh through thirteenth aspects is provided, wherein the organic binder comprises one of: (a) hydroxyethyl cellulose (HEC) at 0.2% to 0.7% by weight, (b) polyethylene oxide (PEO) at 0.1% to 0.8% by weight, (c) HEC and PEO at 0.1% to 1% and 0.03% to 0.47% by weight, respectively, and (d) methyl cellulose and PEO at 0.3% to 0.8% and 0.03% to 0.47% by weight, respectively.

According to a sixteenth aspect, a method for manufacturing a porous ceramic wall flow filter is provided, comprising the steps of: selectively inserting a cement mixture into an end of at least one predetermined cell channel of a ceramic honeycomb structure, wherein the ceramic honeycomb structure comprises a matrix of intersecting porous ceramic walls which form a plurality of cell channels bounded by the porous ceramic walls that extend longitudinally from an upstream inlet end to a downstream outlet end and the cement mixture comprises: (i) inorganic ceramic particles, (ii) an inorganic binder, (iii) an organic binder comprising one or more of a hydrophilic polymer and a hydrophilic additive, and (iv) an aqueous liquid vehicle, wherein the cement mixture disposed in the at least one predetermined cell channel is in the form of a plug that blocks the channel; and drying the plug for a period of time sufficient to at least substantially remove the liquid vehicle from the plug, wherein the cement mixture disposed in at least one predetermined cell channel is in the form of at least one respective plug that blocks the respective at least one channel, and further wherein the cement mixture exhibits a cement viscosity of less than 7000 Pa·s at a shear rate of less than 0.1/sec and greater than 25 Pa·s at a shear rate from 20/sec to 100/sec.

According to a seventeenth aspect, the sixteenth aspect is provided, further comprising: a solids component and a liquids component, the solids component comprising the inorganic ceramic particles and the liquids component comprising the inorganic binder, the organic binder and the aqueous liquid vehicle, wherein the liquids component comprises a liquid viscosity from 50 centipoise to 1500 centipoise at a shear rate from 0.001/sec to 0.007/sec.

According to an eighteenth aspect, the sixteenth aspect is provided, further comprising: a solids component and a liquids component, the solids component comprising the inorganic ceramic particles and the liquids component comprising the inorganic binder, the organic binder and the aqueous liquid vehicle, wherein the liquids component comprises a liquid viscosity from 100 centipoise to 1000 centipoise at a shear rate from 0.001/sec to 0.007/sec.

According to a nineteenth aspect, any one of the sixteenth through eighteenth aspects is provided, wherein the cement mixture comprises: (i) inorganic ceramic particles at 55% to 70%; (ii) an inorganic binder at 15% to 20% by weight; (iii) an organic binder at 0.25% to 1.25% by weight, the organic binder comprising one or more of a hydrophilic polymer and a hydrophilic additive; and (iv) an aqueous liquid vehicle at 15% to 20% by weight.

According to a twentieth aspect, any one of the sixteenth through nineteenth aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate.

According to a twenty-first aspect, any one of the sixteenth through twentieth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a twenty-second aspect, any one of the sixteenth through twenty-first aspects is provided, wherein the organic binder comprises one of: (a) hydroxyethyl cellulose (HEC), (b) polyethylene oxide (PEO), (c) HEC and PEO, and (d) methyl cellulose and PEO.

According to a twenty-third aspect, any one of the sixteenth through twenty-first aspects is provided, wherein the organic binder comprises one of: (a) hydroxyethyl cellulose (HEC) at 0.2% to 0.7% by weight, (b) polyethylene oxide (PEO) at 0.1% to 0.8% by weight, (c) HEC and PEO at 0.1% to 1% and 0.03% to 0.47% by weight, respectively, and (d)

methyl cellulose and PEO at 0.3% to 0.8% and 0.03% to 0.47% by weight, respectively.

According to a twenty-fourth aspect, any one of the sixteenth through twenty-first aspects is provided, wherein the cement mixture further comprises: a solids component and a liquids component, the solids component comprising the inorganic ceramic particles and the liquids component comprising the inorganic binder, the organic binder and the aqueous liquid vehicle, and further wherein a ratio of the solids component to the liquids component is from 0.82:1 to 4:1.

According to a twenty-fifth aspect, a filter body is provided that comprises: a honeycomb structure comprised of intersecting porous walls of a first ceramic material that define channels extending from a first end to a second end; plugging material disposed in a first plurality of the channels; plugging material disposed in a second plurality of the channels, wherein the channels of the first plurality are distinct from the channels of the second plurality; wherein the plugging material disposed in the first plurality, or in the second plurality, or both, is comprised of: a second ceramic material; an inorganic binder comprising one or more of silica and alumina; and an organic binder comprising one or more of a hydrophilic polymer and a hydrophilic additive.

According to a twenty-sixth aspect, the twenty-fifth aspect is provided, wherein the second ceramic material has the same composition as the first ceramic material.

According to a twenty-seventh aspect, the twenty-fifth aspect is provided, wherein the second ceramic material has a composition that differs from the first ceramic material.

According to a twenty-eighth aspect, any one of the twenty-fifth through twenty-seventh aspects is provided, wherein the hydrophilic polymer comprises one or more of hydroxyethyl cellulose (HEC), methyl cellulose, polyethylene oxide (PEO), carboxymethyl cellulose, hydroxypropyl cellulose, polyvinyl alcohol, poly(2-oxazoline), dextran, dextrin, a gum, pectin, polysaccharides, modified cellulose, polyacrylic acid and polystyrene sulfonate.

According to a twenty-ninth aspect, any one of the twenty-fifth through twenty-eighth aspects is provided, wherein the hydrophilic additive comprises one or more of polyethylene oxide (PEO), polyvinylpyrrolidone (PVP), xanthan gum, a PEO-polypropylene oxide (PPO) block copolymer, and PPO.

According to a thirtieth aspect, any one of the twenty-fifth through twenty-ninth aspects is provided, wherein the organic binder comprises one of: (a) hydroxyethyl cellulose (HEC), (b) polyethylene oxide (PEO), (c) HEC and PEO, and (d) methyl cellulose and PEO.

According to a thirty-first aspect, a cement mixture for applying to a ceramic honeycomb body is provided, the cement mixture comprising: (i) inorganic ceramic particles; (ii) an inorganic binder; (iii) an organic binder comprising: a hydrophilic polymer; and a hydrophilic additive comprising a polymer with a different composition than the composition of the hydrophilic polymer, the additive having a weight average molecular weight (Mw) of at least 1,000,000 g/mol; and (iv) an aqueous liquid vehicle.

According to a thirty-second aspect, the cement mixture of the thirty-first aspect, wherein the hydrophilic polymer comprises at least one polymer selected from hydroxyethyl cellulose (HEC), methyl cellulose, carboxymethyl cellulose, hydroxypropyl cellulose, polysaccharides, and modified cellulose.

According to a thirty-third aspect, the cement mixture of the thirty-first aspect or thirty-second aspect, wherein the hydrophilic additive comprises at least one polymer selected from polyethylene oxide (PEO), polyvinylpyrrolidone (PVP), a PEO-polypropylene oxide (PPO) block copolymer, and polypropylene oxide (PPO).

According to a thirty-fourth aspect, the cement mixture of any one of the thirty-first through the thirty-third aspects, wherein the hydrophilic additive comprises at least one polymer having a weight average molecular weight (Mw) of from 1,000,000 g/mol to 8,000,000 g/mol.

According to a thirty-fifth aspect, the cement mixture of any one of the thirty-first through the thirty-fourth aspects, wherein the hydrophilic polymer is present at from 0.5% to 1.5%, by weight.

According to a thirty-sixth aspect, the cement mixture of any one of the thirty-first through the thirty-fifth aspects, wherein the hydrophilic additive is present at from 0.1% to 0.5%, by weight.

According to a thirty-seventh aspect, the cement mixture of any one of the thirty-first through the thirty-sixth aspects, wherein the inorganic ceramic particles are present at from 40% to 50%, by weight.

According to a thirty-eighth aspect, the cement mixture of any one of the thirty-first through the thirty-seventh aspects, wherein the hydrophilic polymer comprises methyl cellulose and the hydrophilic additive comprises polyethylene oxide (PEO), and wherein the methyl cellulose is present at about 0.6% to about 1% and the PEO is present at about 0.2% to about 0.25%, by weight.

According to a thirty-ninth aspect, the cement mixture of the thirty-eighth aspect, wherein the PEO has a weight average molecular weight (Mw) of from 2,000,000 g/mol to 8,000,000 g/mol.

According to a fortieth aspect, the cement mixture of any one of the thirty-first through the thirty-ninth aspects, wherein the cement mixture is a cold set cement mixture.

According to a forty-first aspect, a method for manufacturing a porous ceramic wall flow filter is provided, the method comprising the steps of: selectively inserting a cement mixture into an end of at least one predetermined cell channel of a ceramic honeycomb structure, wherein the ceramic honeycomb structure comprises a matrix of intersecting porous ceramic walls which form a plurality of cell channels bounded by the porous ceramic walls that extend longitudinally from an upstream inlet end to a downstream outlet end, wherein the cement mixture comprises: (i) inorganic ceramic particles; (ii) an inorganic binder; (iii) an organic binder comprising: a hydrophilic polymer; and a hydrophilic additive comprising a polymer with a different composition than the composition of the hydrophilic polymer, the additive having a weight average molecular weight ($M_w$) of at least 1,000,000 g/mol; and (iv) an aqueous liquid vehicle, and wherein the cement mixture disposed in the at least one predetermined cell channel is in the form of at least one respective plug that blocks the respective at least one cell channel; and drying the at least one respective plug for a period of time sufficient to at least partially remove the aqueous liquid vehicle from the mixture.

According to an forty-second aspect, the method of the forty-first aspect, wherein the plurality of cell channels comprises a first plurality of cell channels comprising an upstream inlet end and a downstream outlet end and a second plurality of cell channels comprising an upstream inlet end and a downstream outlet end, and wherein the step of selectively inserting a cement mixture comprises: inserting the cement mixture into at least a portion of the upstream inlet end of the first plurality of cell channels and into at least a portion of the downstream outlet end of the second plurality of cell channels.

According to a forty-third aspect, the method of forty-second aspect, wherein the first plurality of cell channels has a first cross-sectional area, that is different than a second cross-sectional area of the second plurality of cell channels.

According to a forty-fourth aspect, the method of any one of the forty-first through the forty-third aspects, wherein the hydrophilic polymer comprises at least one polymer selected from hydroxyethyl cellulose (HEC), methyl cellulose, carboxymethyl cellulose, hydroxypropyl cellulose, polysaccharides, and modified cellulose.

According to a forty-fifth aspect, the method of any one of the forty-first through the forty-fourth aspects, wherein the hydrophilic additive comprises at least one polymer selected from polyethylene oxide (PEO), polyvinylpyrrolidone (PVP), a PEO-polypropylene oxide (PPO) block copolymer, and polypropylene oxide (PPO).

According to a forty-sixth aspect, the method of any one of the forty-first through the forty-fifth aspects, wherein: the hydrophilic polymer is present in the cement mixture from 0.5% to 1.5%, by weight; and the hydrophilic additive is present in the cement mixture from 0.1% to 0.5%, by weight.

According to a forty-seventh aspect, the method of any one of forty-first through the forty-sixth aspects, wherein the drying the at least one respective plug comprises drying at a temperature that is less than a temperature that results in at least one of reaction of ceramic precursors in the cement mixture and sintering of ceramic materials present in the cement mixture.

According to a forty-eighth aspect, a filter body is provided comprising: a honeycomb structure that comprises intersecting porous walls of a first ceramic material that define channels extending from a first end to a second end; plugging material disposed in a first plurality of the channels at the first end; plugging material disposed in a second plurality of the channels at the second end, wherein the channels of the first plurality are distinct from the channels of the second plurality and the first plurality of channels have a first cross-sectional area that is different than second cross-sectional area of the second plurality of channels, and wherein the plugging material in both the first plurality of channels and the second plurality of channels is derived from a cement mixture comprising: (i) inorganic ceramic particles; (ii) an inorganic binder; and (iii) an organic binder comprising: a hydrophilic polymer; and a hydrophilic additive comprising a polymer with a different composition than the composition of the hydrophilic polymer, the additive having a weight average molecular weight (Mw) of at least 1,000,000 g/mol.

According to a forty-ninth aspect, the filter body of the forty-eighth aspect, wherein: the hydrophilic polymer comprises at least one polymer selected from hydroxyethyl cellulose (HEC), methyl cellulose, carboxymethyl cellulose, hydroxypropyl cellulose, polysaccharides, and modified cellulose; and the hydrophilic additive comprises at least one polymer selected from polyethylene oxide (PEO), polyvinylpyrrolidone (PVP), a PEO-polypropylene oxide (PPO) block copolymer, and polypropylene oxide (PPO).

According to a fiftieth aspect, the filter body of any forty-eighth or the forty-ninth aspects, wherein: the hydrophilic polymer is present in the plugging material from 0.5% to 1.5%, by weight; and the hydrophilic additive is present in the plugging material from 0.1% to 0.5%, by weight.

According to a fifty-first aspect, a particulate filter comprises: a honeycomb structure that comprises intersecting porous walls of a first ceramic material that define channels extending from a first end to a second end; plugs in a first plurality of the channels at the first end; plugs in a second plurality of the channels at the second end, wherein the channels of the first plurality are distinct from the channels of the second plurality and the first plurality of channels have a first cross-sectional area that is different than a second cross-sectional area of the second plurality of channels, and wherein the plugs in both the first plurality of channels and the second plurality of channels have a depth of at least 9 mm, and wherein the plugs in both the first plurality of channels and the second plurality of channels comprise the same cement mixture.

According to a fifty-second aspect, a particulate filter according to the fifty-first aspect, wherein the plugs in both the first plurality of channels and the second plurality of channels are derived from a cement mixture comprising: (i) inorganic ceramic particles; (ii) an inorganic binder; and (iii) an organic binder comprising: a hydrophilic polymer; and a hydrophilic additive comprising a polymer with a different composition than the composition of the hydrophilic polymer, the additive having a weight average molecular weight ($M_w$) of at least 1,000,000 g/mol.

While exemplary embodiments and examples have been set forth for the purpose of illustration, the foregoing description is not intended in any way to limit the scope of the disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:

1. A cement mixture for applying to a ceramic honeycomb body, the cement mixture comprising:
   (i) inorganic ceramic particles;
   (ii) an inorganic binder;
   (iii) an organic binder comprising:
      a hydrophilic polymer; and
      a hydrophilic additive comprising a polymer with a different composition than the composition of the hydrophilic polymer, the hydrophilic additive having a weight average molecular weight (Mw) of at least 1,000,000 g/mol; and
   (iv) an aqueous liquid vehicle.

2. The cement mixture of claim 1, wherein the hydrophilic polymer comprises at least one polymer selected from hydroxyethyl cellulose (HEC), methyl cellulose, carboxymethyl cellulose, hydroxypropyl cellulose, polysaccharides, and modified cellulose.

3. The cement mixture of claim 1, wherein the hydrophilic additive comprises at least one polymer selected from polyethylene oxide (PEO), polyvinylpyrrolidone (PVP), a PEO-polypropylene oxide (PPO) block copolymer, and polypropylene oxide (PPO).

4. The cement mixture of claim 1, wherein the hydrophilic additive comprises at least one polymer having a weight average molecular weight ($M_w$) of from 1,000,000 g/mol to 8,000,000 g/mol.

5. The cement mixture of claim 1, wherein the hydrophilic polymer is present at from 0.5% to 1.5%, by weight.

6. The cement mixture of claim 1, wherein the hydrophilic additive is present at from 0.1% to 0.5%, by weight.

7. The cement mixture of claim 1, wherein the inorganic ceramic particles are present at from 40% to 50%, by weight.

8. The cement mixture of claim 1, wherein the hydrophilic polymer comprises methyl cellulose and the hydrophilic additive comprises polyethylene oxide (PEO), and wherein the methyl cellulose is present at about 0.6% to about 1% and the PEO is present at about 0.2% to about 0.25%, by weight.

9. The cement mixture of claim 1, wherein the cement mixture exhibits a cement viscosity of less than 7000 Pa·s at a shear rate of less than 0.1/sec and greater than 25 Pa·s at a shear rate from 20/sec to 100/sec.

10. A method for manufacturing a porous ceramic wall flow filter, comprising the steps of:
selectively inserting a cement mixture into an end of at least one predetermined cell channel of a ceramic honeycomb structure, wherein the ceramic honeycomb structure comprises a matrix of intersecting porous ceramic walls which form a plurality of cell channels bounded by the porous ceramic walls that extend longitudinally from an upstream inlet end to a downstream outlet end, wherein the cement mixture comprises:
  (i) inorganic ceramic particles;
  (ii) an inorganic binder;
  (iii) an organic binder comprising:
    a hydrophilic polymer; and
    a hydrophilic additive comprising a polymer with a different composition than the composition of the hydrophilic polymer, the additive having a weight average molecular weight ($M_w$) of at least 1,000,000 g/mol; and
  (iv) an aqueous liquid vehicle, and wherein the cement mixture disposed in the at least one predetermined cell channel is in the form of at least one respective plug that blocks the respective at least one cell channel; and
drying the at least one respective plug for a period of time sufficient to at least partially remove the aqueous liquid vehicle from the mixture.

11. The method of claim 10, wherein the plurality of cell channels comprises a first plurality of cell channels comprising an upstream inlet end and a downstream outlet end and a second plurality of cell channels comprising an upstream inlet end and a downstream outlet end, and wherein the step of selectively inserting a cement mixture comprises:
inserting the cement mixture into at least a portion of the upstream inlet end of the first plurality of cell channels and into at least a portion of the downstream outlet end of the second plurality of cell channels.

12. The method of claim 11, wherein the first plurality of cell channels has a first cross-sectional area that is different than a second cross-sectional area of the second plurality of cell channels.

13. The method of claim 10, wherein the hydrophilic polymer comprises at least one polymer selected from hydroxyethyl cellulose (HEC), methyl cellulose, carboxymethyl cellulose, hydroxypropyl cellulose, polysaccharides, and modified cellulose.

14. The method of claim 10, wherein the hydrophilic additive comprises at least one polymer selected from polyethylene oxide (PEO), polyvinylpyrrolidone (PVP), a PEO-polypropylene oxide (PPO) block copolymer, and polypropylene oxide (PPO).

15. The method of claim 10, wherein:
the hydrophilic polymer is present in the cement mixture from 0.5% to 1.5%, by weight; and
the hydrophilic additive is present in the cement mixture from 0.1% to 0.5%, by weight.

16. The method of claim 10, wherein the drying the at least one respective plug comprises drying at a temperature that is less than a temperature that results in at least one of reaction of ceramic precursors in the cement mixture and sintering of ceramic materials present in the cement mixture.

17. The method of claim 10, wherein the selectively inserting comprises inserting the cement mixture to a depth of at least 9 mm in the at least one predetermined cell channel.

18. A filter body comprising:
a honeycomb structure that comprises intersecting porous walls of a first ceramic material that define channels extending from a first end to a second end;
plugging material disposed in a first plurality of the channels at the first end;
plugging material disposed in a second plurality of the channels at the second end, wherein the channels of the first plurality are distinct from the channels of the second plurality and the first plurality of channels have a first cross-sectional area that is different than a second cross-sectional area of the second plurality of channels, and
wherein the plugging material in both the first plurality of channels and the second plurality of channels is derived from a cement mixture comprising:
  (i) inorganic ceramic particles;
  (ii) an inorganic binder; and
  (iii) an organic binder comprising:
    a hydrophilic polymer; and
    a hydrophilic additive comprising a polymer with a different composition than the composition of the hydrophilic polymer, the additive having a weight average molecular weight ($M_w$) of at least 1,000,000 g/mol;
wherein:
the hydrophilic polymer comprises at least one polymer selected from hydroxyethyl cellulose (HEC), methyl cellulose, carboxymethyl cellulose, hydroxypropyl cellulose, polysaccharides, and modified cellulose; and
the hydrophilic additive comprises at least one polymer selected from polyethylene oxide (PEO), polyvinylpyrrolidone (PVP), a PEO-polypropylene oxide (PPO) block copolymer, and polypropylene oxide (PPO).

19. The filter body of claim 18, wherein:
the hydrophilic polymer is present in the plugging material from 0.5% to 1.5%, by weight; and
the hydrophilic additive is present in the plugging material from 0.1% to 0.5%, by weight.

20. A particulate filter comprising the filter body of claim 19:
wherein the plugs in both the first plurality of channels and the second plurality of channels have a depth of at least 9 mm, and
wherein the plugs in both the first plurality of channels and the second plurality of channels comprise the same cement mixture.

* * * * *